US012291435B2

(12) United States Patent
Häggström

(10) Patent No.: US 12,291,435 B2
(45) Date of Patent: May 6, 2025

(54) LIFTING DEVICE

(71) Applicant: Erik Häggström, Umeå (SE)

(72) Inventor: Erik Häggström, Umeå (SE)

( * ) Notice: Subject to any disclaimer, the term of this patent is extended or adjusted under 35 U.S.C. 154(b) by 52 days.

(21) Appl. No.: 16/956,598

(22) PCT Filed: Dec. 6, 2018

(86) PCT No.: PCT/SE2018/000035

§ 371 (c)(1),
(2) Date: Jun. 21, 2020

(87) PCT Pub. No.: WO2019/125263

PCT Pub. Date: Jun. 27, 2019

(65) Prior Publication Data

US 2022/0135380 A1 May 5, 2022

(30) Foreign Application Priority Data

Dec. 21, 2017 (SE) .................................. 1730350-4

(51) Int. Cl.
*B66C 23/44* (2006.01)
*B60P 1/48* (2006.01)
(Continued)

(52) U.S. Cl.
CPC .............. *B66C 23/44* (2013.01); *B60P 1/483* (2013.01); *B60P 1/5428* (2013.01); *B60P 1/549* (2013.01); *B66C 23/14* (2013.01); *B66C 23/62* (2013.01)

(58) Field of Classification Search
CPC ......... B66C 23/44; B66C 23/14; B66C 23/62; B60P 1/483; B60P 1/5428; B60P 1/549; B60P 1/5423; B60P 1/5485
See application file for complete search history.

(56) References Cited

U.S. PATENT DOCUMENTS 3,095,099 A 6/1963 Costello
3,276,610 A 10/1966 Thatcher
(Continued)

FOREIGN PATENT DOCUMENTS

DE 2264787 A1 8/1975
DE 3040637 A1 6/1982
(Continued)

OTHER PUBLICATIONS

Supplemental European Search Report issued Jul. 14, 2022.

*Primary Examiner* — Jonathan Snelting
(74) *Attorney, Agent, or Firm* — Aera A/S

(57) ABSTRACT

Lifting system (1) for mounting on a loading surface of a vehicle (3), comprising at least one first lifting arm system (4) on one side of the loading surface in the transverse direction of the vehicle (3) and at least one second lifting arm system (5) on the other side of the cargo area in the transverse direction of the vehicle (3). The lifting arm systems (4, 5) comprises at least one foundation (6) with which the respective lifting arm system (4, 5) is connected to the vehicle (3), The lift arm systems (4, 5) each comprise at least one lifting arm (9) and at least one operating mechanism (15). The lifting device (1) comprises at least one lifting boom (13) extending between the lifting arm (9) in the first lifting arm system (4) and the lifting arm (9) in the second lifting arm system (5), The operating mechanism (15) is operated with at least one actuator (27). The actuating mechanism (15) comprises at least one first operating arm (16), which is rotatably connected at one end, or end thereof, to the base (6) and at its other end, or its proximity is connected to the lifting arm (9) via at least one arm link (22). The operating arm (16) and the arm link (22) are pivotally connected to each other and the arm link (22) is pivotally arranged relative to the lifting arm (9). The operating
(Continued)

mechanism (15) further comprises at least one operating link (25) which is pivotally connected to the operating arm (16).

6 Claims, 23 Drawing Sheets

(51) Int. Cl.

| | |
|---|---|
| ***B60P 1/54*** | (2006.01) |
| ***B66C 23/14*** | (2006.01) |
| ***B66C 23/62*** | (2006.01) |

(56) References Cited

U.S. PATENT DOCUMENTS

| | | | | |
|---|---|---|---|---|
| 3,794,192 | A | 2/1974 | Monson | |
| 4,067,245 | A | 1/1978 | Santic' et al. | |
| 4,265,585 | A | 5/1981 | Hawkins | |
| 2008/0279668 | A1 * | 11/2008 | Alexander | B60P 1/483<br>414/607 |
| 2011/0215065 | A1 * | 9/2011 | Seales | B66C 23/44<br>212/294 |
| 2018/0079345 | A1 * | 3/2018 | Sawatzky | B60P 1/022 |

FOREIGN PATENT DOCUMENTS

| | | | | |
|---|---|---|---|---|
| GB | 2353267 | A | 2/2001 | |
| WO | WO-2017003354 | A1 * | 1/2017 | B60P 1/54 |

* cited by examiner 25d
25b
25a
25
25c 10, 11
6
22
9, 38
9, 39
34, 36
33, 35

10, 11
6
22
9, 38
9, 39
34, 36
33, 35

42
42
1
51

LIFTING DEVICE

FIELD OF THE INVENTION

The present invention concerns a lifting system, intended to be mounted on a vehicle, in accordance with the claims.

TECHNICAL BACKGROUND

In order to lift up cargo on loading platforms on larger vehicles, such as on trucks, it is previously well known to provide the vehicle with a crane arrangement, crane construction or the like. Crane arrangements and crane constructions are also developed which are intended for mounting on smaller trucks. However, crane constructions take a relatively large place and can therefore be difficult or impossible to mount on a light track, such as, for example, a so-called "pick-up".

It is further known in the past to use lifting arrangements used in so-called lift dumpers which comprise two side-mounted lifting arms which can be folded back out of the lifting vehicle. A container standing on the ground is connected to the lifting arms and, by turning/lifting the lifting arms over the platform on the truck, the container is lifted onto the truck's platform. The lifting devices on so-called lift dumpers have the disadvantage that these lifting devices take up a lot of space and therefore cannot be used on loading platforms of limited size.

Lifting devices for light trucks are further known, for example, by U.S. Pat. No. 4,383,791 and patent application US2012275890. However, the lifting devices according to the aforementioned documents differ substantially from the construction according to the present patent application. For example, said constructions comprise a rigid lifting arm which is too space-consuming to be able to be mounted on a vehicle with a limited loading platform size, such as on the flat of a light truck with, for example, a double cab.

The patent SE539034 describes a variant of a lifting device which is intended to be connected to the loading platform on a truck with double cab. The construction according to the patent differs substantially from the construction in accordance with the present patent application. For example, the construction according to the patent entails that a winch is needed to achieve the desired effect. Furthermore, there are problems with the control of the movement of the lifting arm in its end positions.

Another problem with existing designs is that these can only be used essentially for one application and one purpose. For example, only a lifting function can be achieved. This should be seen in contrast to the present invention which, in addition to lifting device, can be used for at least one further purpose.

PURPOSE OF THE INVENTION

The purpose of the present patent application is to eliminate or substantially reduce at least one of the aforementioned or any of the problems mentioned in the following description of the existing types of lifting device. The purpose is solved by a lifting device in accordance with the claims.

BRIEF DESCRIPTION OF THE DRAWINGS

The present invention will hereinafter be described in more detail with reference to the accompanying schematic drawings which illustrate by way of example the presently preferred embodiment of the invention.

DETAILED DESCRIPTION OF THE INVENTION

Figure 1A:
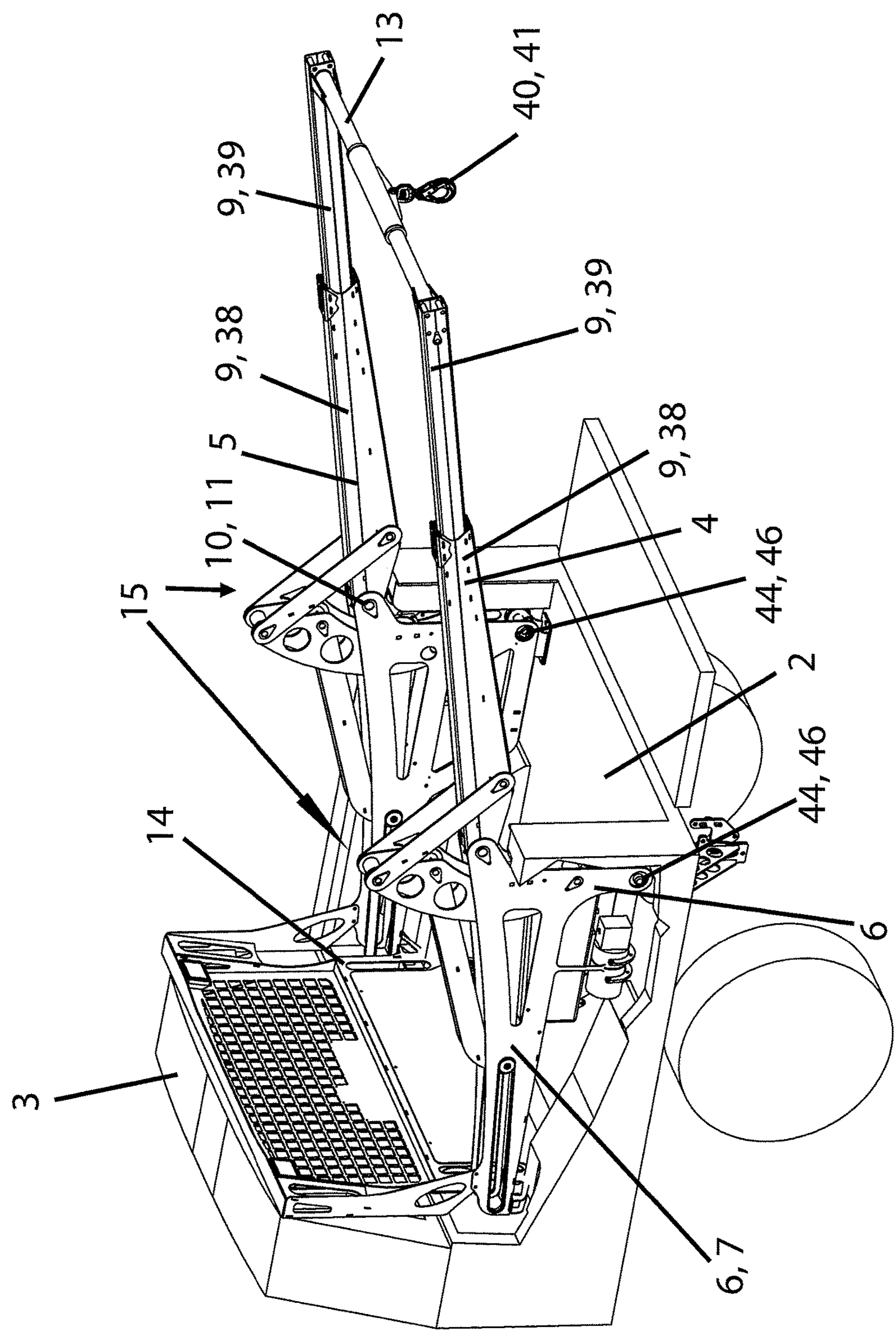
FIGS. 1A and 1B show the present lifting device connected to a vehicle.
Figure 1B:
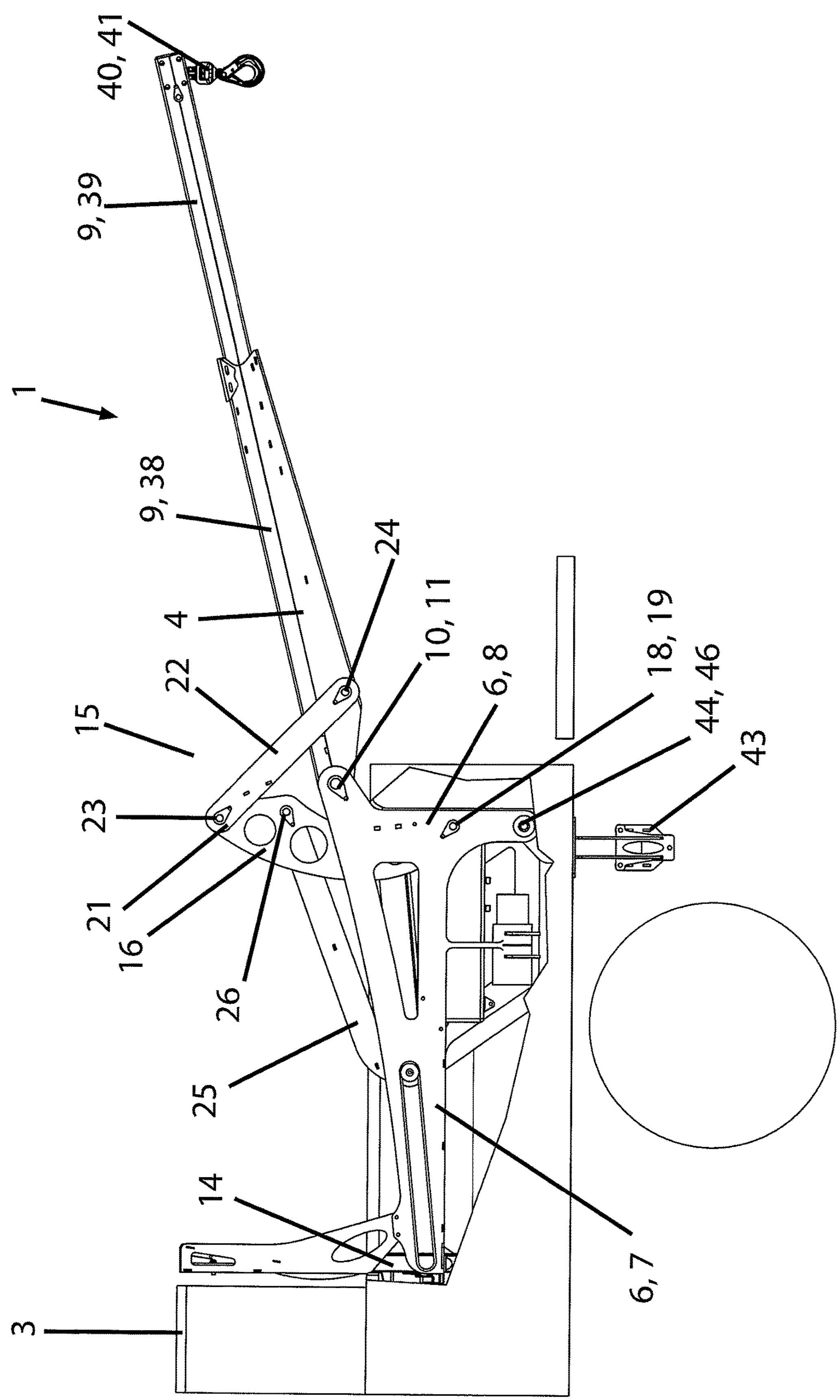

With reference to the figures, a lifting system 1 (lifting device) according to the present invention should be described in more detail. The lifting system 1 is preferably intended to be connected to at least one loading surface of a vehicle 3. The loading surface may for instance be a loading platform 2. Preferably, the lifting system 1 is intended to be connected to the loading platform 2 on a so-called "pick up", light truck or similar vehicle 3 In alternative embodiments, the lifting system 1 may be used in or on other types of vehicles. For example, the vehicle 3 may be a trailer, boat, ship or other vehicle.

In the exemplary embodiment, the lifting system 1 comprises at least one first lifting arm system 4 and at least one second lifting arm system 5. The first lifting arm system 4 is placed on one side of the loading platform 2 in the transverse direction of the vehicle 3. The second lifting arm system 5 is placed on the other side of the loading platform 2. By sides is meant the sides of the platform which are directed in the direction of travel of the vehicle 3. The two lifting arm systems 4 and 5 are of similar construction, or essentially of similar constructions, therefore only one lifting arm system is described in more detail. However, this does not exclude that the lifting arm systems 4 and 5 in alternative embodiments may be of different construction.

In alternative embodiments, the number of lifting arm systems 4 and 5 may be more or less than two. In further embodiments, the lifting arm systems 4 and 5 shown can be defined as part of a common lifting arm system.

The exemplary lifting arm systems 4 and 5 each comprise a foundation 6, frame, rigid attachment part or the like. For example, the foundation 6 may be made of sheet metal, for example laser cut, partly with reinforcements. In the exemplary embodiment shown in more detail in FIG. 3B, it is shown that the foundation 6 comprises at least one first foundation part 6*a* and at least one second foundation part 6*b*. The foundation parts 6*a* and 6*b* are connected to each other via at least one spacer part 6*c*.

The foundation 6, the body, the fastening part, is attached to the cargo surface of the vehicle 3. In the exemplary embodiment, the loading surface is for instance constituted by a loading platform 2, chassis, or other part suitable for the purpose, or parts of the vehicle 3. The foundation 6 is connected with connection means suitable for the purpose, not shown in figures, such as, for example, screw joints in accordance with the prior art. technique. The screw connections may, for example, comprise fixing bolts. In alternative embodiments, other suitable technology may be used to connect the foundation 6 to the loading platform 2.

The foundation parts 6*a* and 6*b* each comprise at least one first foundation part 7 which extends in the longitudinal direction of the vehicle towards the cab of the vehicle. In those cases where the loading platform comprises wheel housings, the shape of the foundation part 7 is adapted to the shape of the wheel housing.

The foundation parts 6*a* and 6*b* further comprise, in the exemplary embodiment, an upstanding, substantially vertical, second foundation part 8, part of the core or the like. To the second foundation part 8, at least one lifting arm 9 is rotatable connected. In the exemplary embodiment, the lifting arm 9 is pivotally connected to the upper end, or the proximity of the upper end. The lifting arm 9, which is pivoted around axis of rotation 10, is connected to the vertical foundation part 8 via at least one bearing 11 or other suitable construction for the purpose, where the bearing is connected to a first bracket 12 in the foundation 6.

The lifting device 1 comprises at least one lifting boom 13 which extends between the lifting arm 9 in the first lifting arm system 4 and the lifting arm 9 in the second lifting arm system 5 in the transverse direction of the vehicle 3. Preferably, the lifting boom 13 is connected between the free ends of the lifting arms 9, or the proximity of the free ends.

The foundation 6 of the first lifting arm system 4 and the foundation 6 of the second lifting arm system 5 are preferably connected to each other by at least one front stem 14, a transverse member, beam or the like. In alternative embodiments, the base 6 of the first lifting arm system 4 and the foundation 6 of the second lifting arm system 5 are not connected to each other by at least one front frame 14.

The movement of the lifting arm 9 in the respective lifting arm systems 4 and 5 on each side of the platform 3 is controlled by at least one operating mechanism 15, mechanism or the like.

Referring now to FIGS. 3A to 3D, an exemplary operating mechanism 15 is shown in more detail. The actuating mechanism 15 comprises at least one first operating arm 16, first mechanism part which, at one end 17, or near its end, is pivotally connected via at least one bearing 18 around the axis of rotation 19 to the second foundation part 6*b*. The bearing is connected to a second bracket 20 in the second base part 6*b* of the foundation 6.

At its other end 21, or near its end, the operating arm 16 is connected to the lifting arm 9 via at least one arm link 22, second mechanism part, connecting part or the like. The operating arm 16 and the arm link 22 are pivotally connected to each other, around axis of rotation 23, via at least one bearing. The arm link 22 is pivotally connected via at least one bearing to the lifting arm 9 around at least one axis of rotation 24. The operating mechanism 15 further comprises at least one operating link 25, third mechanism part, which is pivotally connected via at least one hearing to the operating arm 16, around a axis of rotation 26, at a position closer to the first end than the other end. Said bearings are of a previously known construction, therefore these have not been described in more detail in this patent application.

Figure 5:
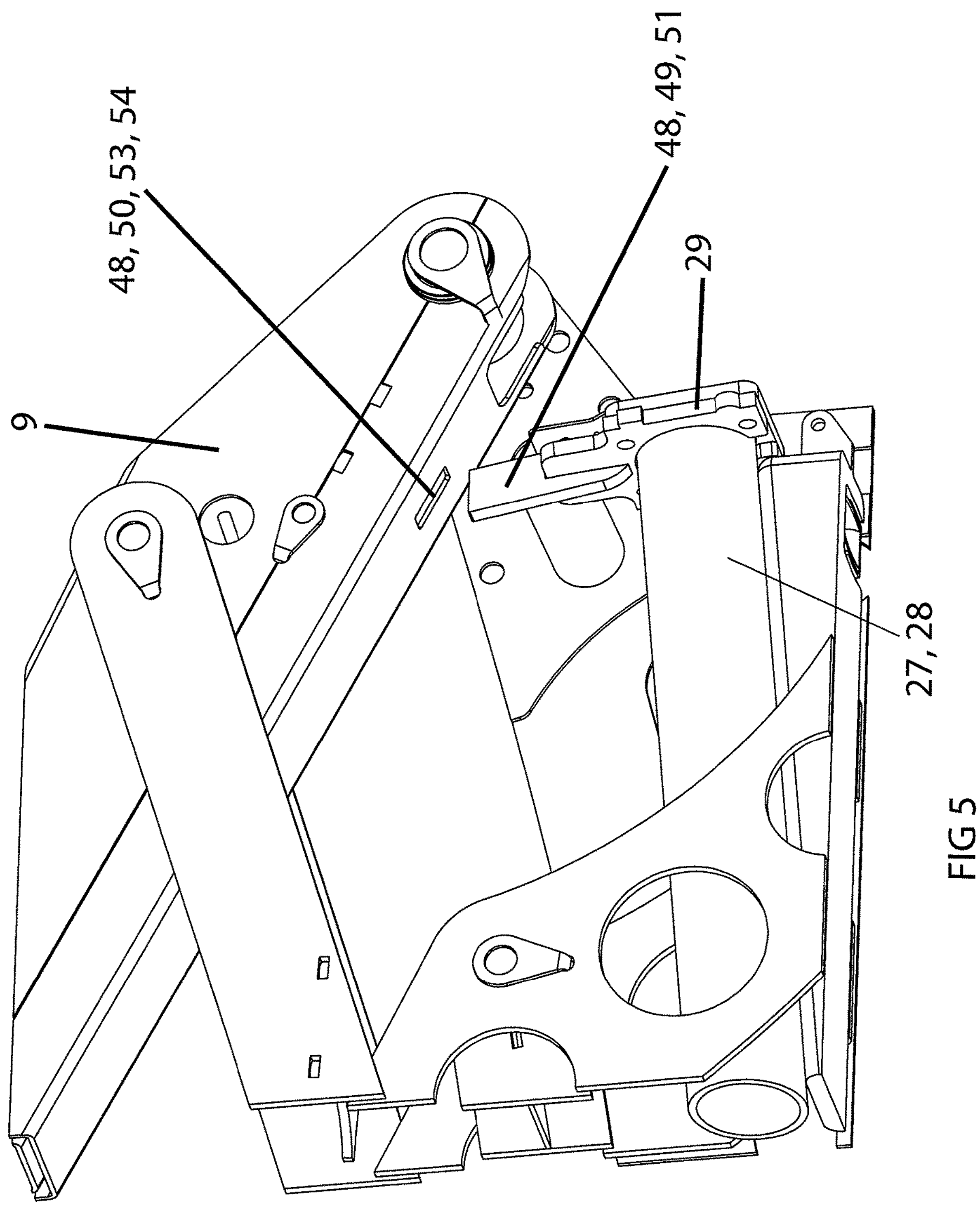
FIG. 5 shows a safety device for preventing the operation of the lifting arm's length when the lift arm is folded down.

For actuation of the respective lifting arm systems 4 and 5 actuating mechanism 15, these each comprise at least one actuator 27. In the exemplary embodiment shown in FIG. 3E, the operating member 27 consists of at least one hydraulic cylinder (a hydraulic piston/cylinder assembly) 28. The actuator 27, the hydraulic cylinder 28, is designed so that it is telescopically extensible and contractible and acts on the lifting arm 9 to be rotated relative to its axis of rotation 19. The hydraulic cylinder 28, in the exemplary embodiment, is connected at one end to at least one bracket 29, shown in FIG. 5. The bracket 29 is preferably fixed or movably connected to the foundation 6.

At its other end, the hydraulic cylinder is connected via at least one shaft or the like to the second mechanism part 25 of the operating mechanism 15. The lifting arm systems 4 and 5 comprise, or are connected to, at least one hydraulic unit 30, hydraulic pump or the like with which pressurized liquid can be supplied to the system. The hydraulic unit 30 is connected, for example, to at least one fastening device 31 in the foundation. In alternative embodiments, the hydraulic unit 30 may be connected to another part of the lifting device or may constitute a separate part.

Figure 3A:
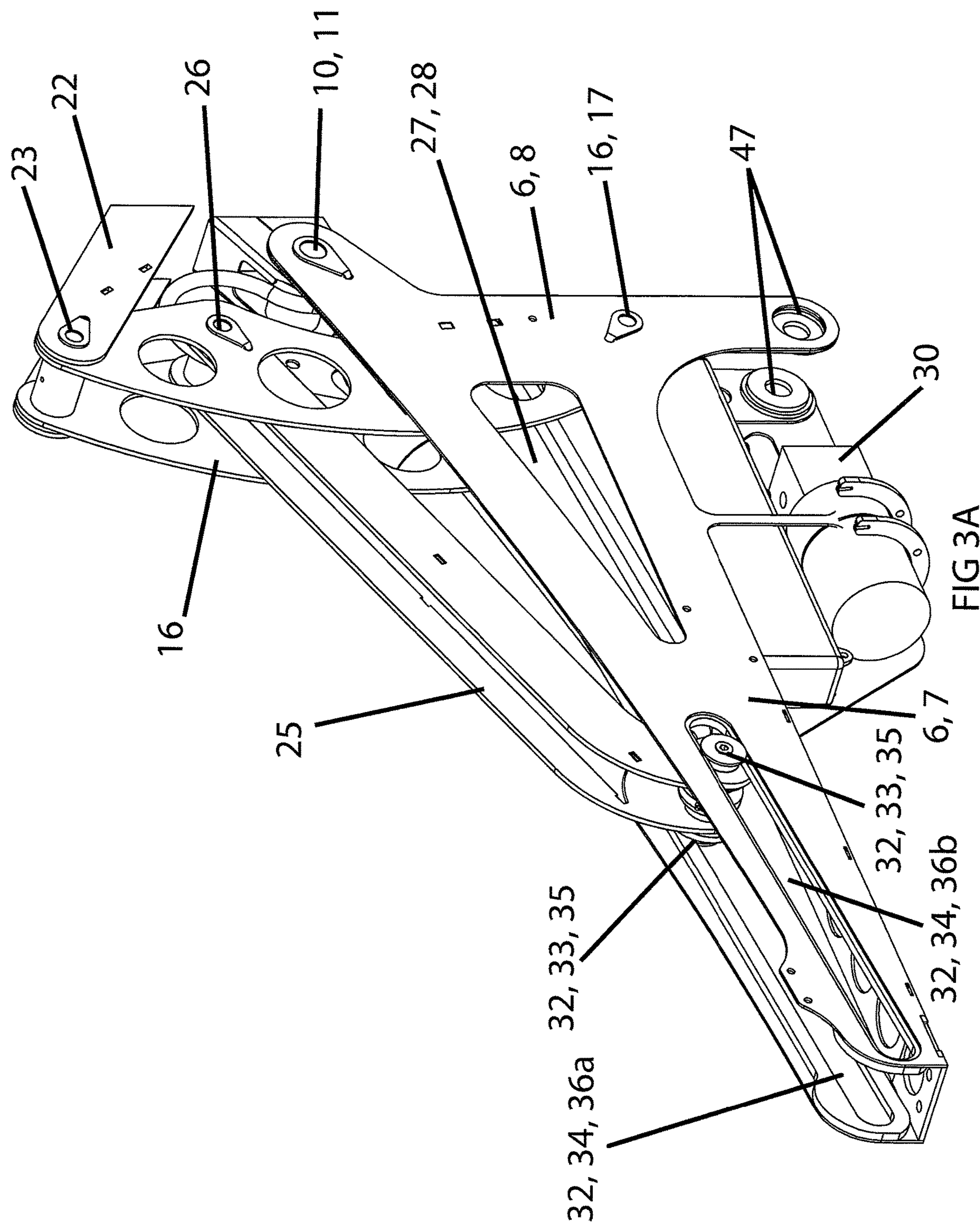
FIG. 3A shows the control mechanism of the operating mechanism in more detail.
Figure 3B:
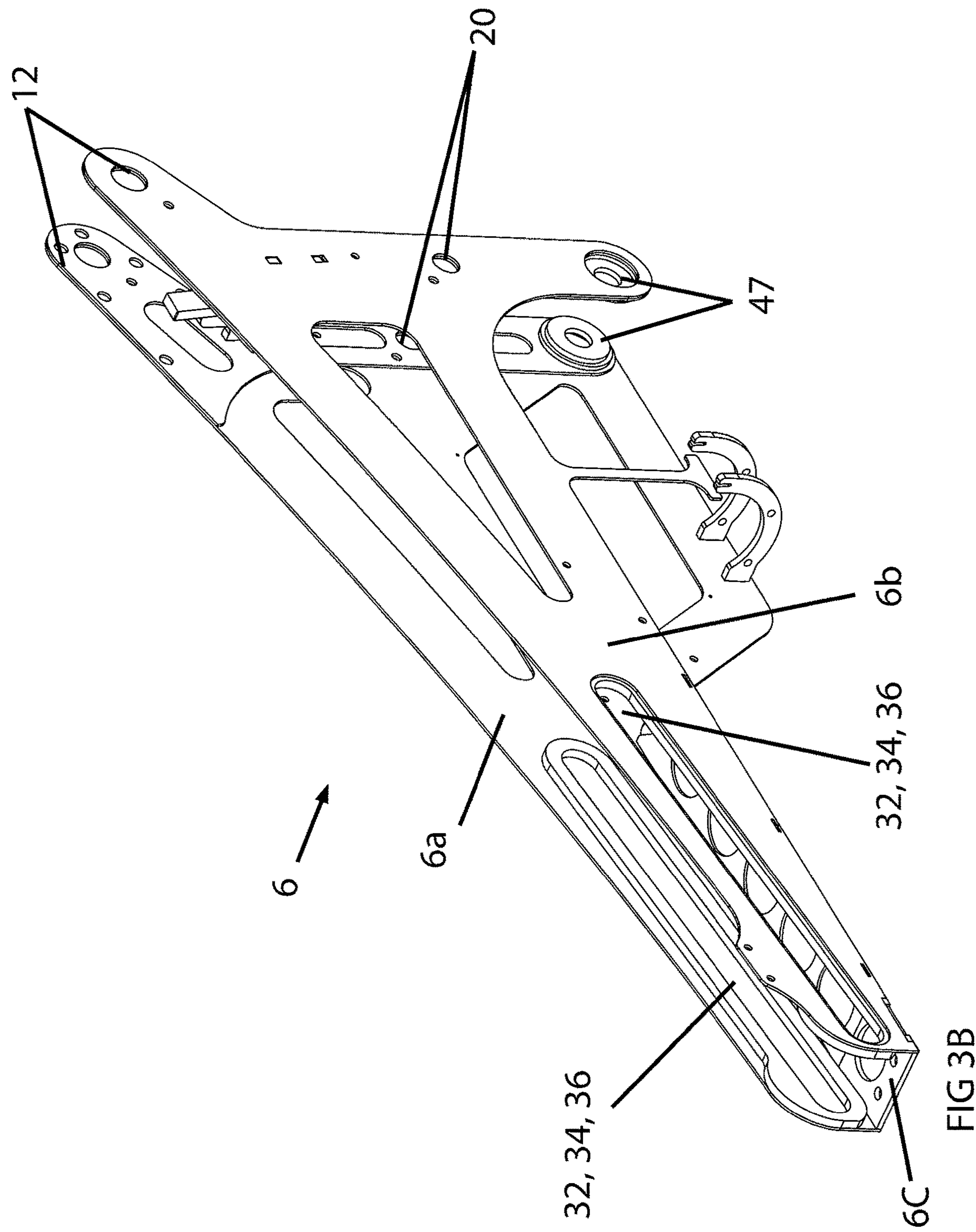
FIG. 3B shows the foundation in more detail.

The movement of the movable end of the actuator 27 is controlled via a guide device 32, control. In the exemplary embodiment, this is placed in the foundation 6, more specifically connected to the foundation parts 6*a* and 6*b*. With reference to FIG. 3A, it is shown that the guide device 32 consists of at least one first guide member 33 and at least one second guide member 34. The guide mechanism 32 also connects the second mechanism part 25. In the exemplary embodiment, the first guide member 33 is constituted by a shaft 35, pin or the like which is mounted in the second guide member 34, which in the exemplary embodiment consists of at least one guide groove 36. In the figures, double guide grooves 36, consisting of at least one first, are shown, guide groove 36*a* and at least one second guide groove 36*b*. The shaft 35 is movable after the extension of the guide grooves 36*a* and 36*b*. In the case of an extension of the actuator 27 such as the hydraulic cylinder 28, the shaft 35 in the guide grooves 36*a* and 36*b* is moved in the guide device 32 in one direction. When the hydraulic cylinder is shortened, the shaft 35 moves in the guide grooves 36*a* and 36*b* in the second direction. The guide grooves 36*a* and 36*b* are straight, in the longitudinal direction, in the exemplary embodiment. However, in alternative embodiments, the guide grooves 36*a* and 36*b* may be curved or of another shape suitable for the purpose, in its longitudinal direction.

Figure 3C:
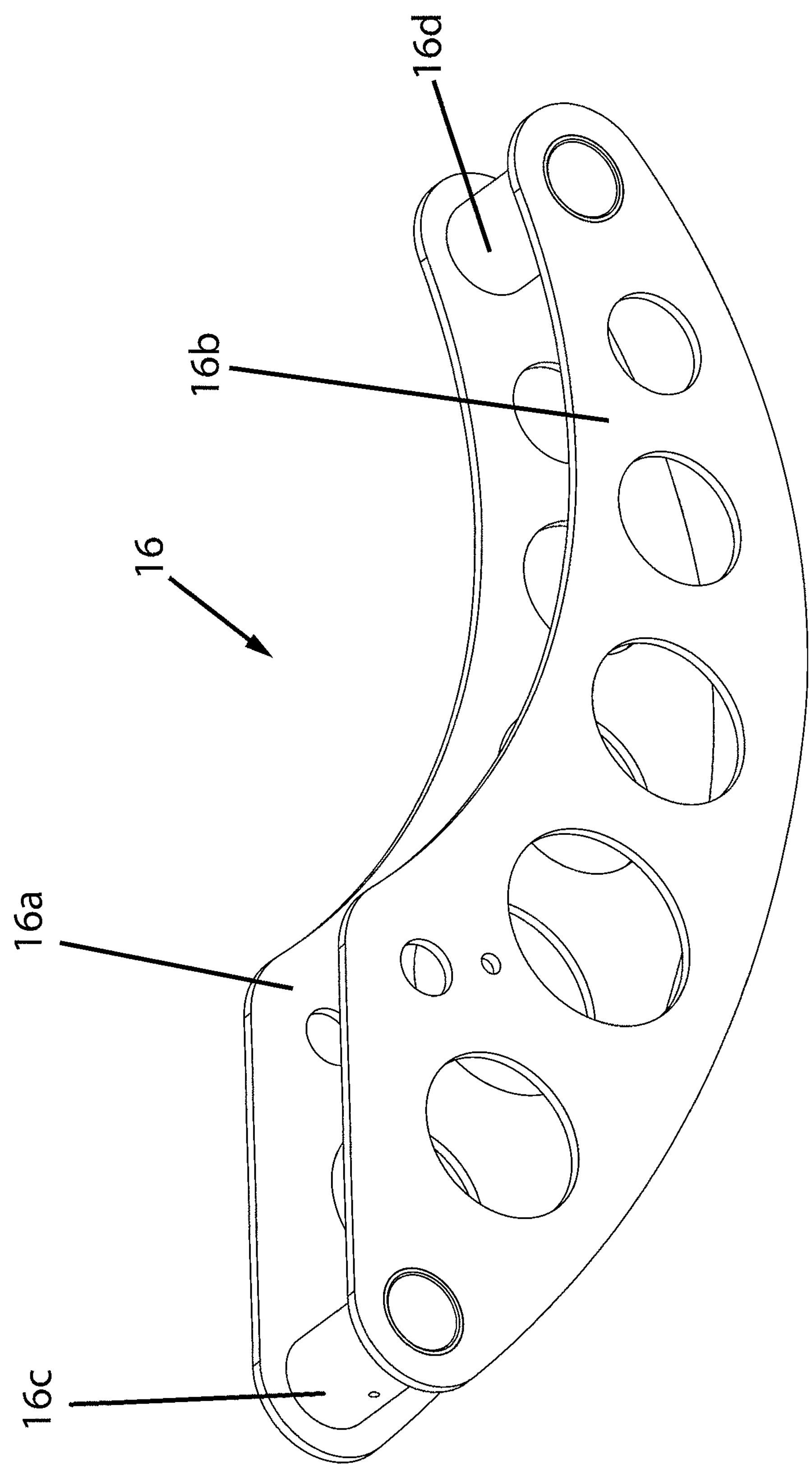
FIG. 3C shows the operating arm in more detail.
Figure 3D:
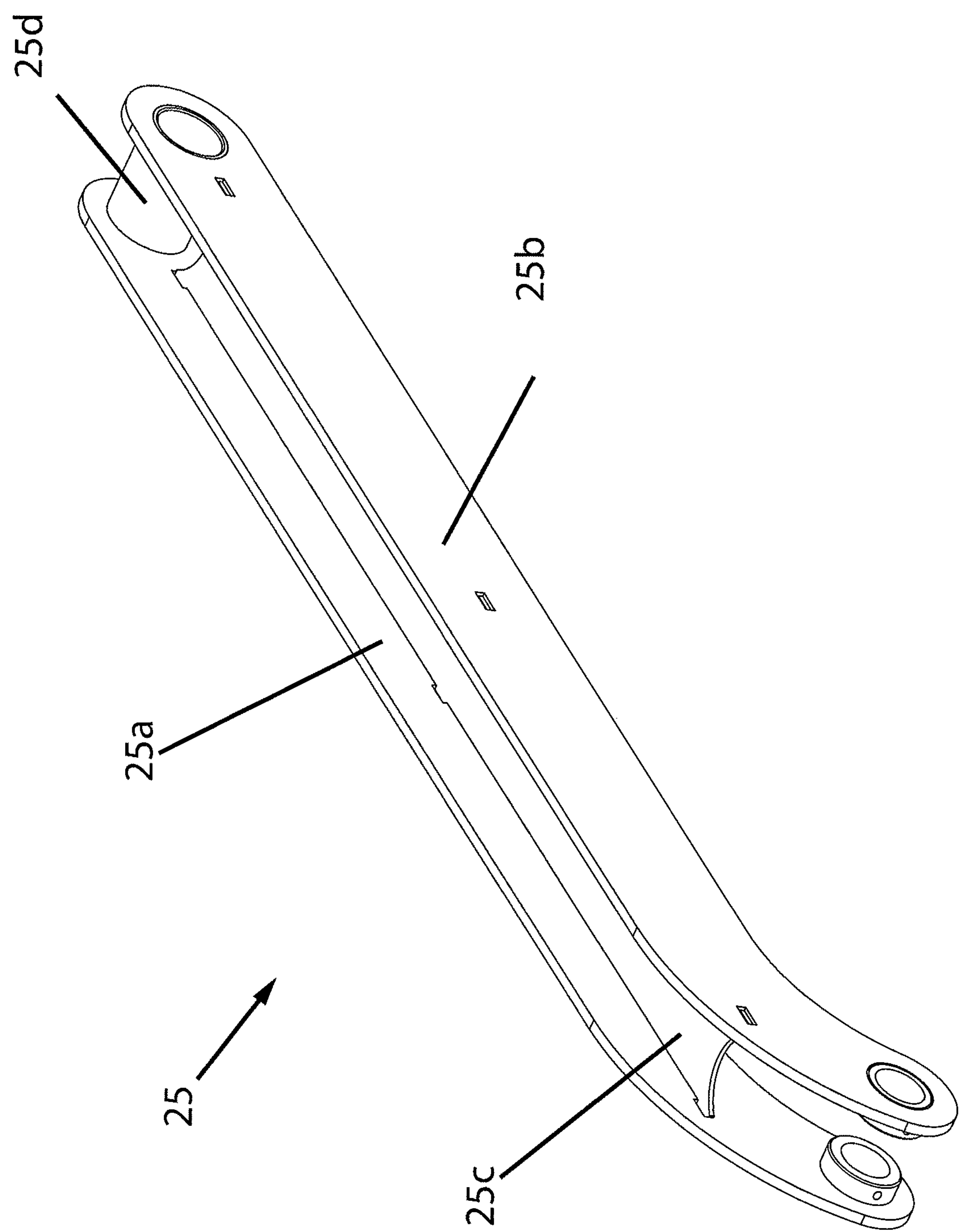
FIG. 3D shows the second mechanism part in more detail.
Figure 3E:
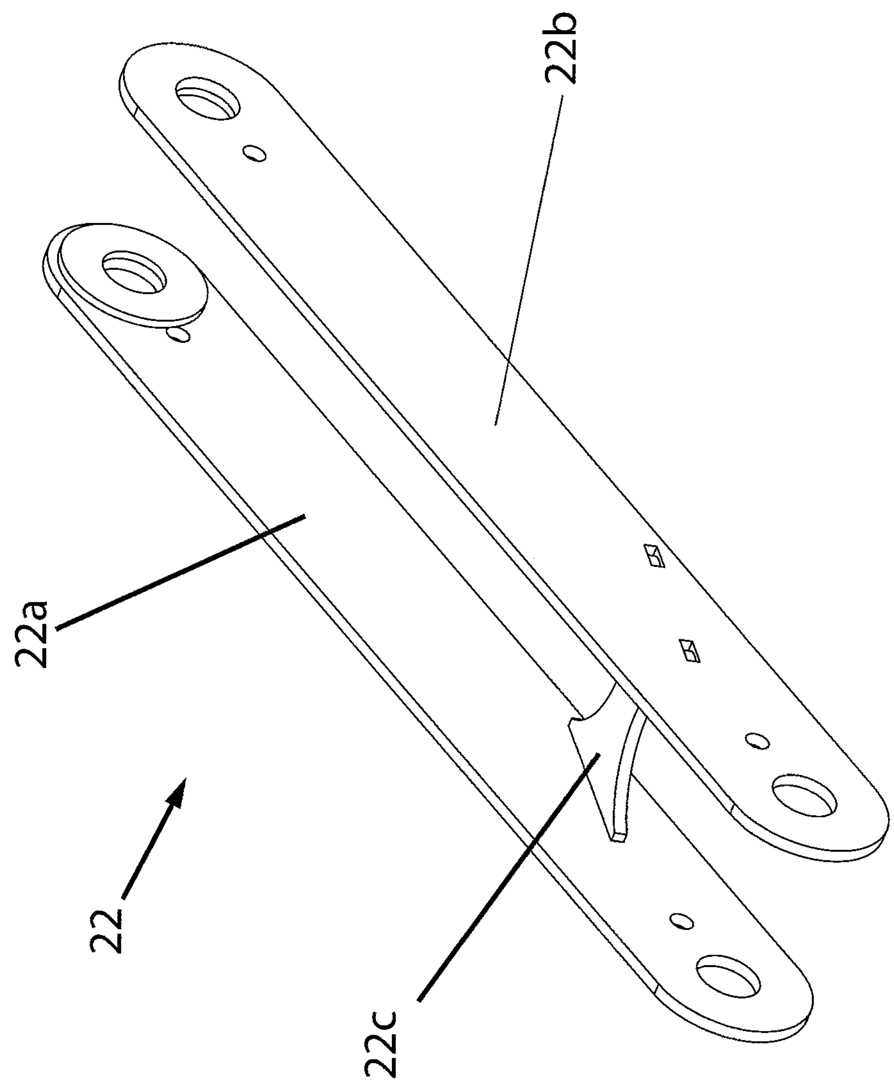
FIGS. 3E and 3F show the strut in more detail and a side view of the lifting device, respectively.
Figure 3F:
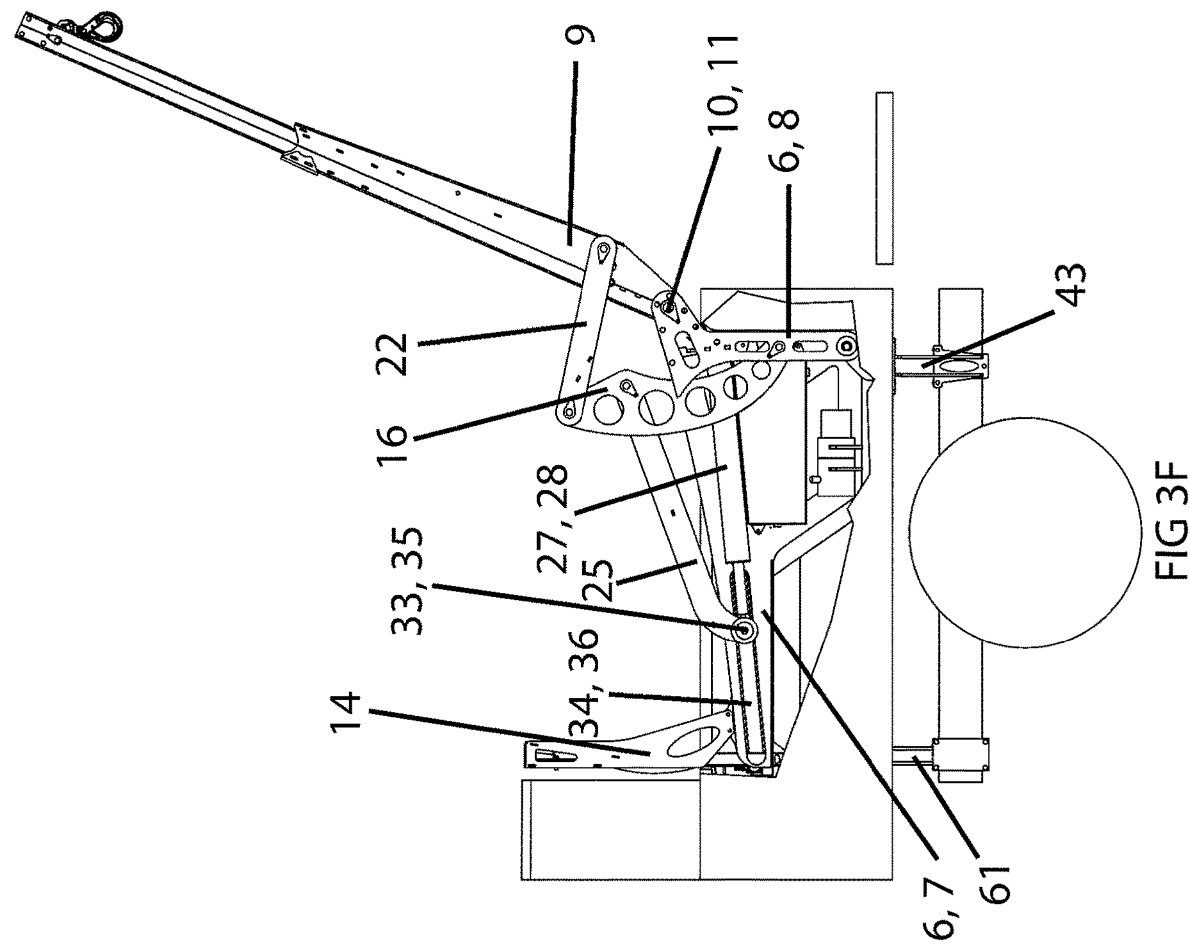

Referring to FIG. 3F, a lifting device is shown with one of the foundation members removed so that the hydraulic cylinder 28 is to be seen more clearly. At one end, the hydraulic cylinder 28 is connected to a bracket which in turn is connected to the foundation. The hydraulic cylinder 28 is at its other end, the end of the piston rod, connected to the shaft 35. To the shaft 35, one end of the operating link 25 is connected. The other end of the operating link 25 is connected to the operating arm 16. One end of the arm link 22 is connected to the operating link 25. The arm link 22 is connected at its other end to the lifting arm 9.

In the case of an extension, or shortening, of the hydraulic cylinder 28, the shaft 35 will be displaced in the longitudinal direction of the grooves, 36*a* and 36*b*. Because the operating link 25 is connected at one end to the shaft 35, the operating link 25, via its other end, which is connected to the operating arm 16, will actuate the operating arm 16 to rotate about the pivot axis 19. Upon rotation of the operating arm 16, this will be via the arm link 22, which is connected at one end to the operating arm 16 and is connected at its other end to the lifting arm 9, to actuate the lifting arm 9 to rotate around the center of rotation of the lifting arm 10. When the hydraulic cylinder is extended, the lifting arm is turned towards the cab of the vehicle. When the length of the hydraulic cylinder decreases, the lifting arm is rotated in the direction of the cab.

The angle of the grooves 36_a_ and 36_b_ is of central importance to the ability to build the structure compact and cost-effective. Optimally, the angle is 5.5 degrees relative to the horizontal plane, or in relation to the plane of the flake. Within the inventive concept, the angle is within the range +/−10 degrees relative to the angle 5.5 degrees. However, this does not exclude that the angle of the groove's deviates from the exemplary angle range.

Referring to FIG. 3C, an exemplary embodiment of the mechanism operating arm 16 is shown. In the exemplary embodiment, the operating arm 16 includes at least a first operating arm portion 16_a_ and a second operating arm portion 16_b_. The operating arm portions are connected to each other by at least one first spacer 16_c_ and at least one second spacer 16_d_. In the exemplary embodiment, the spacers are tubular bodies, but in alternative embodiments may be any other suitable design.

Referring to FIG. 3D, the second mechanism part 25 is shown in more detail. The second mechanism part 25 comprises at least one first mechanism part 25_a_ and at least one second mechanism part 25_b_. The first mechanism part 25_a_ and the second mechanism part 25_b_ are connected to each other via at least one first distance 25_c_ and at least one second distance 25_d_. In the exemplary embodiment, the first spacer member 25_c_ is a plate and the second spacer member 25_d_ is a tube or the like. In alternative embodiments, the spacers 25_c_ and 25_d_, respectively, may be of any other suitable design for the purpose than the exemplary ones. The number of spacers can also be more or less than the one exemplified.

Referring to FIG. 3E, a variant of the connector portion 22 is shown. In the exemplary embodiment, it includes at least one first connector portion 22_a_ and a second connector portion 22_b_ which are connected to each other via at least one spacer 22_c_. In the exemplary embodiment, the spacer 22_c_ is constituted by sheet metal, but in alternative embodiments it may be any other construction suitable for the purpose.

In the exemplary embodiment of the present invention, the length of the Sifting arm 9 from the pivot axis 10 of the lifting arm 9 to the free end 37 can be changed so that the lifting arm 9 becomes shorter or longer. This can be done with different possible variants of technology. In the exemplary embodiment, this takes place in that the lifting arm 9 comprises at least one first arm part 38 and at least one second arm part 39 which can be moved mutually so that the lifting arm 9 becomes shorter or longer. This is preferably done by the arm part 38 and the arm part 39 being telescopic relative to each other. The telescopic movement of arm part 38 and arm part 39 relative to each other takes place, for example, by means of at least one hydraulic cylinder which can be extended or shortened. In the figures, the first arm part 38 of the lifting arm 9 and second arm part 39 are constituted by an outer and an inner profile, tube or the like, one of which can be inserted into the other. In alternative embodiments, other suitable technology may be used. The first arm part 38 of the lifting arm 9 and the second arm part 39 are preferably mutually movable. The bearing can be sliding bearings or other suitable bearings for the purpose.

In order to lift goods on the loading platform, the goods need to he gripped, this regardless of its height from the ground and regardless of its shape. To enable this, at least one lifting means 40 is provided on the lifting boom 12. The lifting means 40 comprises, or consists of, at least one lifting hook 41 or the like which is connected to the lifting boom 13. Preferably, the lifting hook 41 is pivotally connected to the lifting boom 13. In the exemplary embodiment, the construction a part rotatable to the lifting boom 13, which allows rotation about the axial center of the lifting beam 13. The construction of the present lifting device 1 has the advantage that it does not require a winch for lifting to take place. Despite said advantage, the present lifting device 1, in alternative embodiments, may comprise at least one winch.

In further embodiments, at least one implement or the like can be connected to the lifting boom. The implement may be pivotally arranged relative to the lifting boom 13. In other embodiments, the implement may be locked to a specific position, the angle of rotation about the axial center of the lifting beam 13. The rotation can be done with the actuator previously known for this purpose.

Figure 1C:
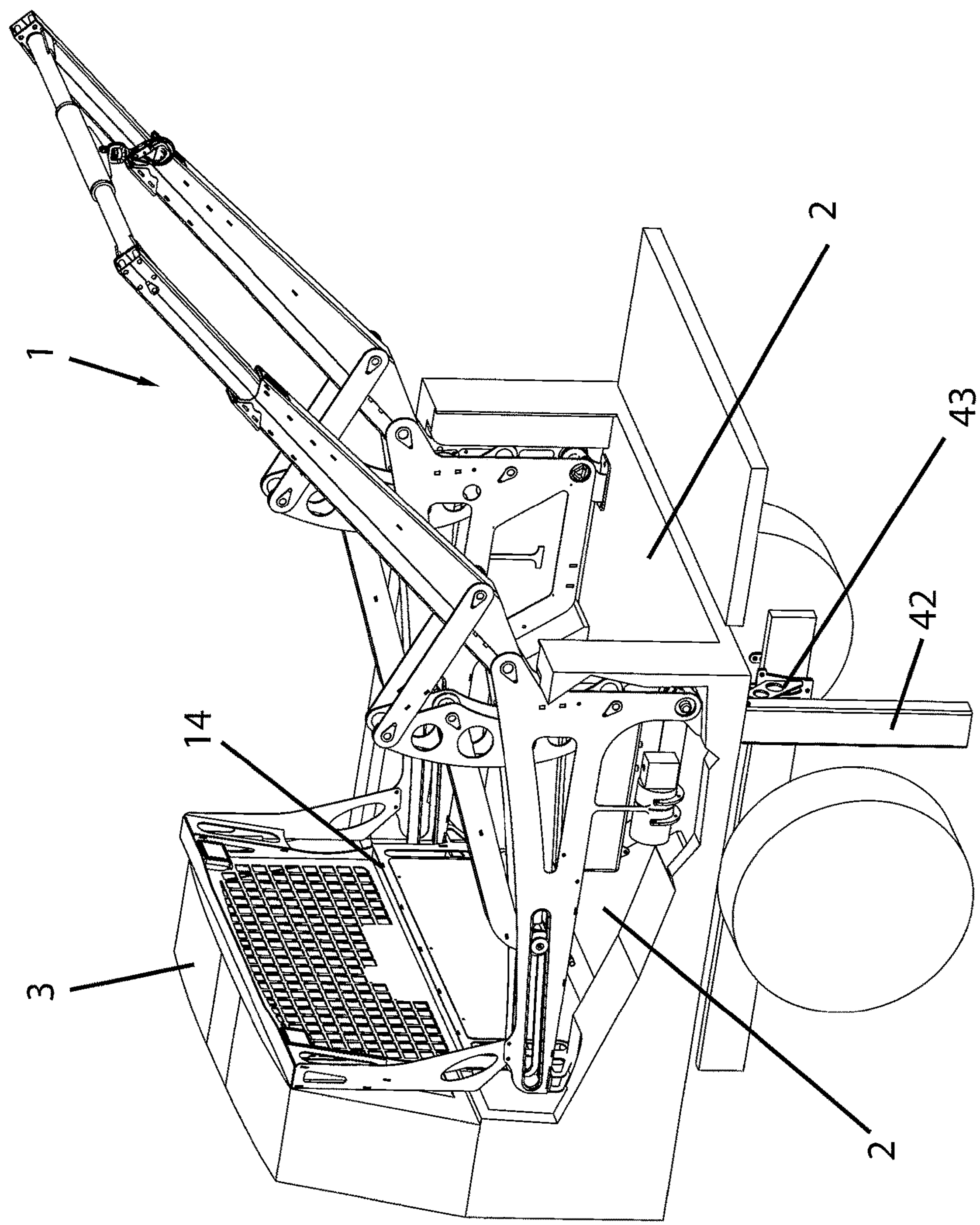
FIG. 1C shows a variant of a lifting device with support legs.
Figure 2:
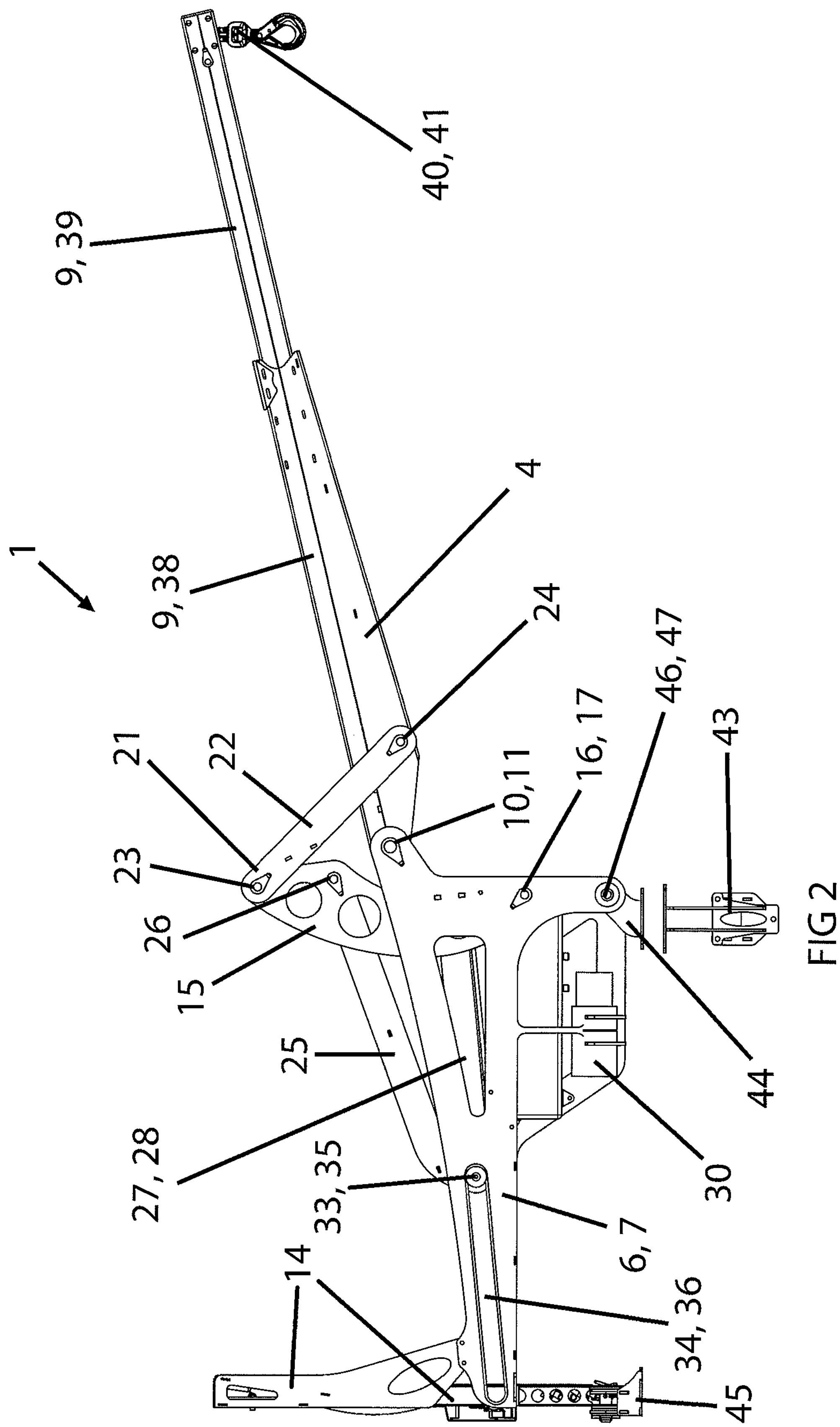
FIG. 2 shows the lifting device in more detail.

Referring to FIG. 1C, an embodiment of the invention is shown which comprises at least one support leg 42 and preferably two support legs 42. In order to lift a heavier load on the loading platform 2, the vehicle 3 may be provided with extendable support legs 42 which can support and stabilize the vehicle 3 and the lifting device 1 during lifting of the load on the loading platform 2, especially during the phase when the center of gravity of the load is at a distance behind the loading platform 2 of the vehicle 3. The construction further preferably comprises at least one bracket 43. The first function of the bracket 43 is to support the platform against at least one frame beam in the vehicle, or against at least one other suitable part of the vehicle as part of the chassis. The bracket 43 can be used for support legs. The support legs 42 may be removable and/or foldable. In the exemplary embodiment, the number of support legs 42 is two. In alternative embodiments, the number of support legs 42 may be fewer or more than two.

Figure 4:
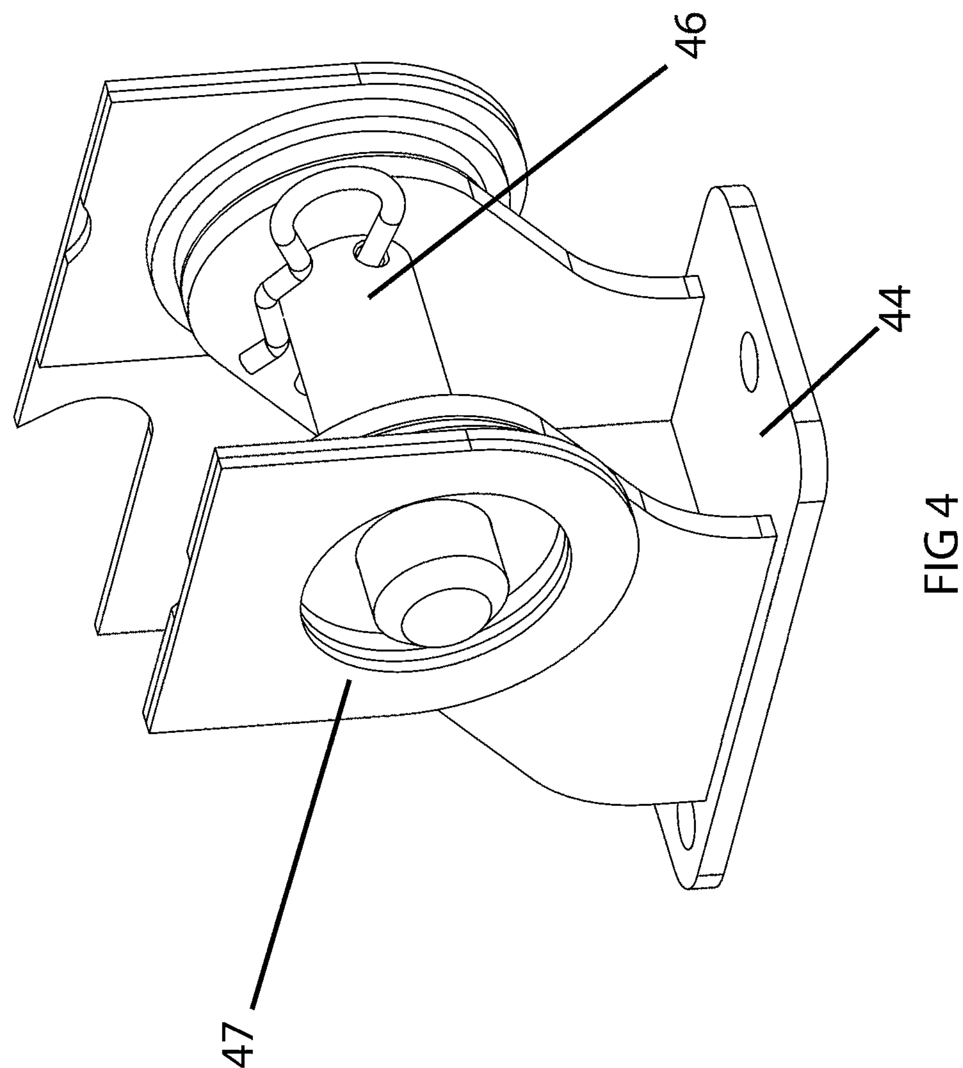
FIG. 4 shows the foundation's attachment to the loading platform.

The foundation 6 is connected to the vehicle with at least one first bracket 44 and at least one second bracket 45. Referring to FIG. 4, an embodiment of an exemplary bracket 44 is shown with which the foundation 6 of the lifting device 1 is connected to the vehicle. The bracket 44 is connected via at least one quick-coupling 46 or the like to at least one bracket 47 in the foundation 6. The quick-coupling 46 is of the prior art, therefore the construction of this quick-coupling 46 is not described in more detail. In its front part, the lifting device 1 is connected to the platform 2 by at least one second bracket 45 which is connected to the foundation 6 or to the front frame 14. Preferably, this connection takes place with the fasteners. Because the lifting device 1 is connected to the vehicle with quick coupling, the lifting device can be quickly disconnected from the vehicle. It is further possible for the lifting device 1, if connected via objects to the objects above the vehicle, to be lifted by itself from the vehicle.

In order to prevent the lifting arm 1 from being operated at the wrong time, which preferably when the lifting atm 9 is folded down towards the loading platform 2, the lifting device 1 comprises at least one safety device 48 which is intended to prevent the telescopic function between the first part 38 of the lifting arm 9 and the second part 39 of the lifting arm 9 operated. In the exemplary embodiment of FIG. 5, the safety device 48 comprises at least one first locking member 49 and at least one second locking means 50. The first locking member 49 consists of a pin 51, or the like, which engages the other in the locking position (lifted down position of the lifting arm 9), the locking member 50, which in the exemplary embodiment consists of at least one hole 52, a recess or the like in the first part 38 of the lifting arm 9 and at least one second hole 53, recess or the like in the second part 39 of the lifting arm 9. In alternative embodiments, the safety device 48 may be of another construction of the prior art suitable for the purpose. When the first part 38 of the lifting arm and the second part 39 of the lifting arm are maximally combined, or substantially maximally combined, the positions of the holes 52 and 53 coincide so that the pin 51 can be inserted into the holes 52 and 53. When the pin 51 is inserted into the holes 52 and 53, a mutual operation of the first part 38 of the lifting arm 9 and the second part 39 of the lifting arm.

In alternative embodiments, it is conceivable that the safety device 48 comprises at least one sensor, not shown in figures, which senses the first arm part 38 and second arm part 39 relative positions. The sensed position between the first arm part 38 and the second arm part 39 determines whether the lifting arm 9 can be operated to rotate around the axis of rotation 10 in the direction of rotation towards the loading platform and the cab and vice versa, that is to say that the sensed rotation angle senses whether the arm part 38 can be moved in relation to arm parts 39.

In the exemplary embodiment, the front stem also has a function of preventing the pin 51 from being damaged by an engagement with the arm when the holes are not in position relative to each other. The arm is prevented from being operated by the upper part of the stem when the arm is near its maximum shortest position, or in a mutual position which allows the arm to be operated without damaging the roof of the vehicle.

The lifting device 1 comprises at least one control system, or is connected to at least one control system, for operating the functions of the lifting device 1. The control system controls, for example, the rotation of the lifting arm in relation to the center of rotation and the movements of the lifting arm's first and second parts. The control system is of known type therefore this is not described in more detail in this patent application.

The figures show that the foundation parts 6*a* and 6*b* and the parts 16*a* and 16*b* of the operating arm 16 comprise holes and recesses which intend to make the respective parts easier (so-called reliefs). The number and size of these, in each detail, may vary.

Figure 6:
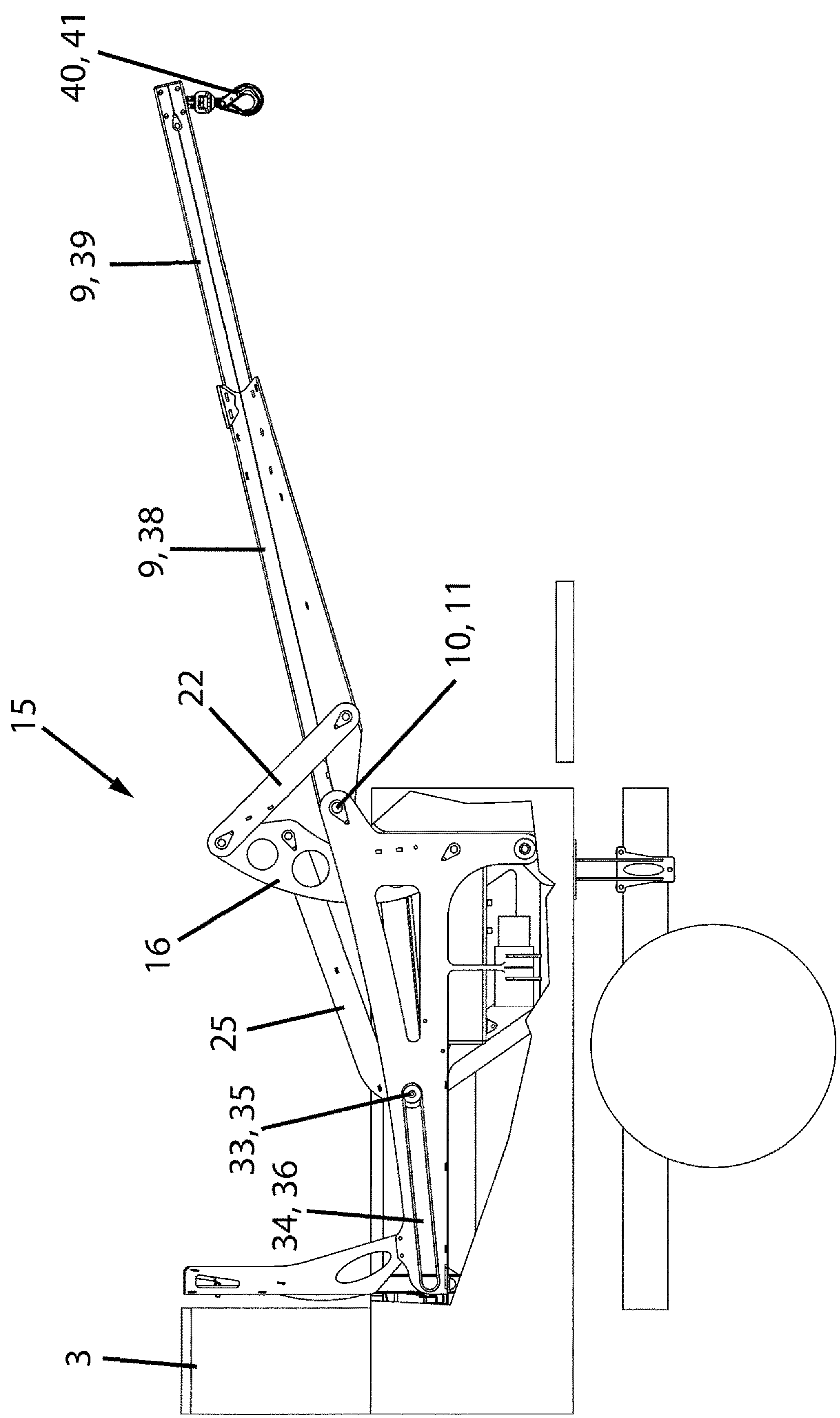
FIGS. 6-11 show the lifting device in different positions during a lifting sequence.

Referring to FIGS. 6 to 11, the lifting arm 9 of the lifting device 1 is shown in different positions relative to the vehicle 3 and the vehicle loading platform 2. In FIG. 6, the lifting arm 9 of the lifting device 1, where its first part 38 and the second part 39 are in their most extended position, is shown, or near its most extended location. The lifting boom 13 is at its greatest distance to the pivot axis 10 of the lifting arm 9 behind the loading platform 3 of the loading vehicle in a position where the lifting means can grip the goods directly or indirectly. The lifting boom 13 and the lifting means 40 have been brought down against any goods (not shown in figures) which are to be lifted. What is to be lifted is connected to the lifting means 40, such as the lifting hook 41, in a suitable and known manner for the purpose.

Figure 7:
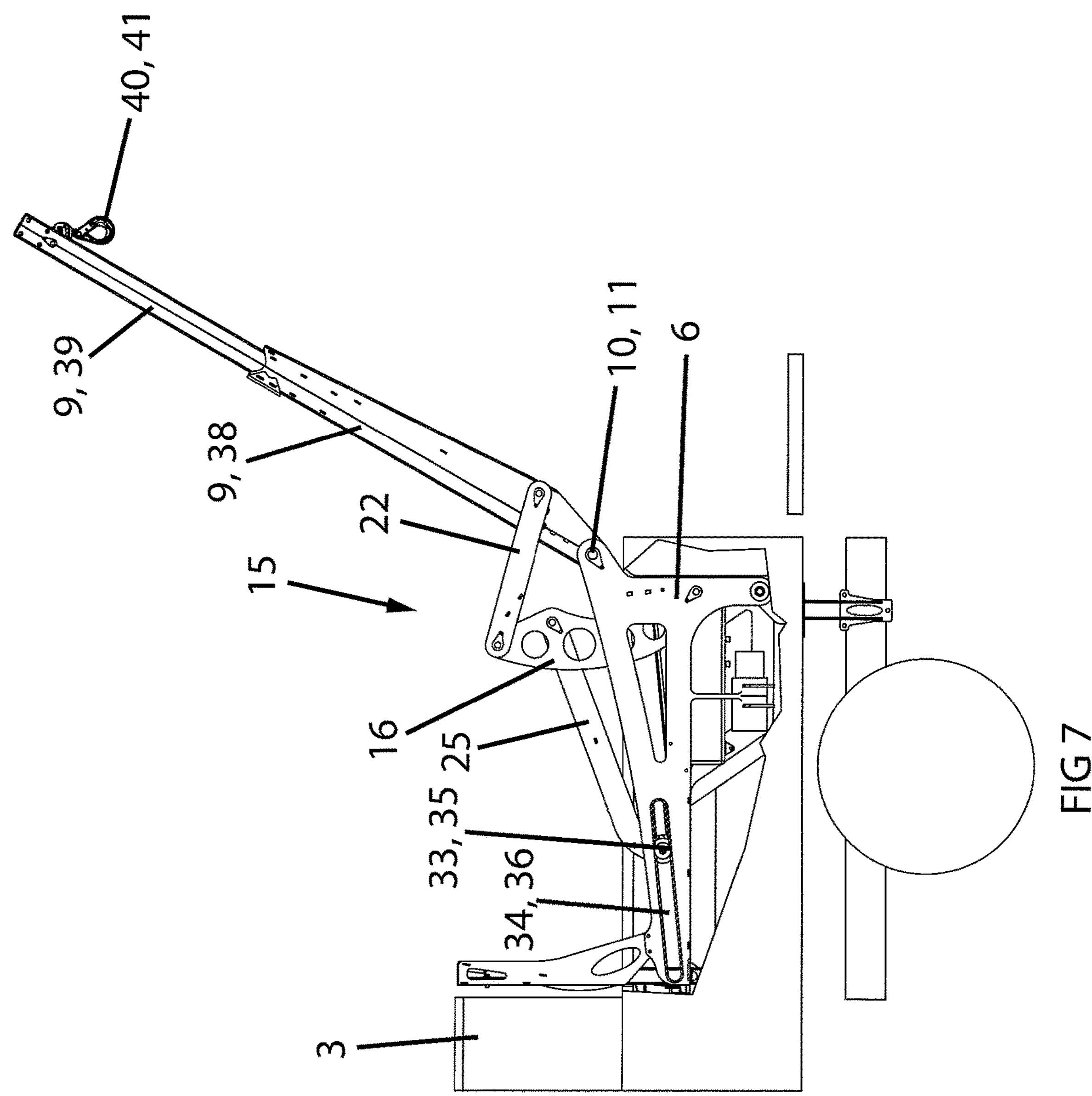

Referring to FIG. 7, the lifting device 1 is shown in a position where rotation of the lifting arm 9 has begun. The hydraulic cylinder 28 has been extended and, via the shaft 35, via the operating mechanism 15, has actuated the lifting arm 9 to rotate about the pivot axis 10. When lifting goods, the goods or the like to be lifted usually have to be lifted from the base.

Figure 8:
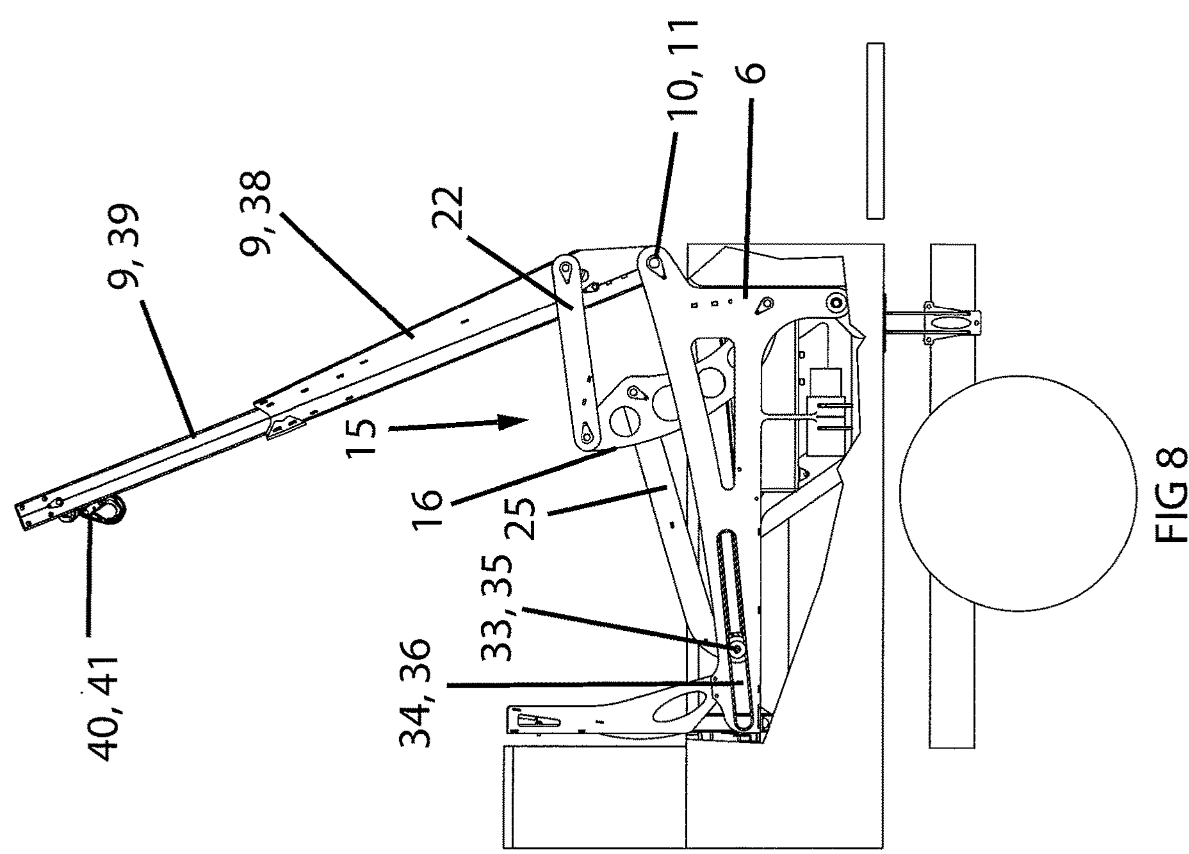

Referring to FIG. 8, the lifting device 1 is shown in a position where the one to be lifted has been rotated over the loading platform 2. The hydraulic cylinder 28 has been further extended and via the shaft 35 via the operating mechanism 15 has acted on the lifting arm 9 to be further rotated about its axis of rotation 10. When the goods are lifted a simultaneous movement of this towards the loading surface 2 of the vehicle 3.

Figure 9:
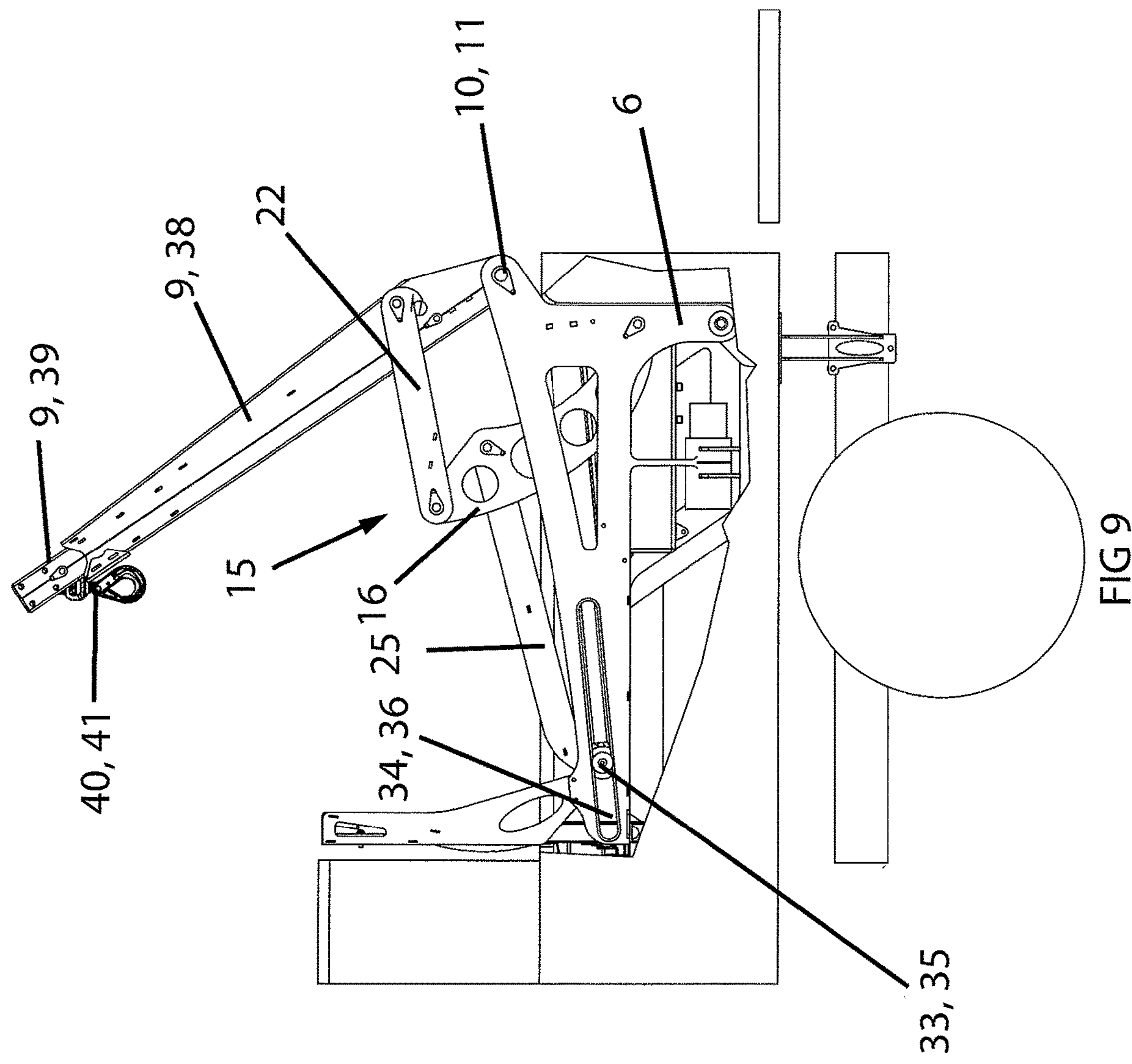

Referring to FIG. 9, the lifting device 1 is shown in a position where it is to be lifted down on the loading platform 2. The hydraulic cylinder 28 has been further extended and has, via the operating mechanism 15, actuated the lifting arm 9 and the lifted material is turned over over the loading surface 2 on the vehicle 3. The lifting boom 13 together with the arm part 39 has been operated in the direction of the axis of rotation 10 of the lifting arm 9.

Figure 10:
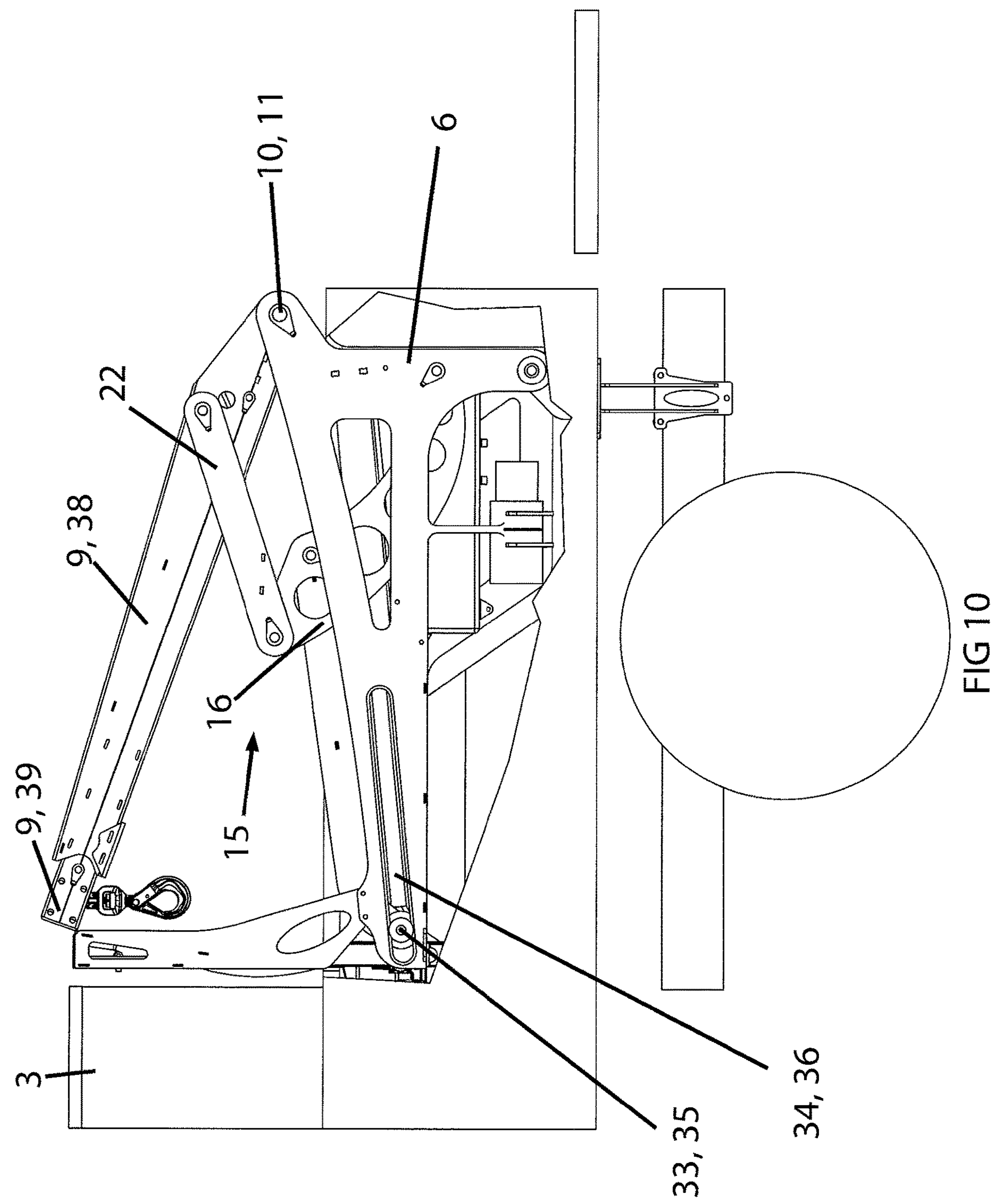
Figure 11:
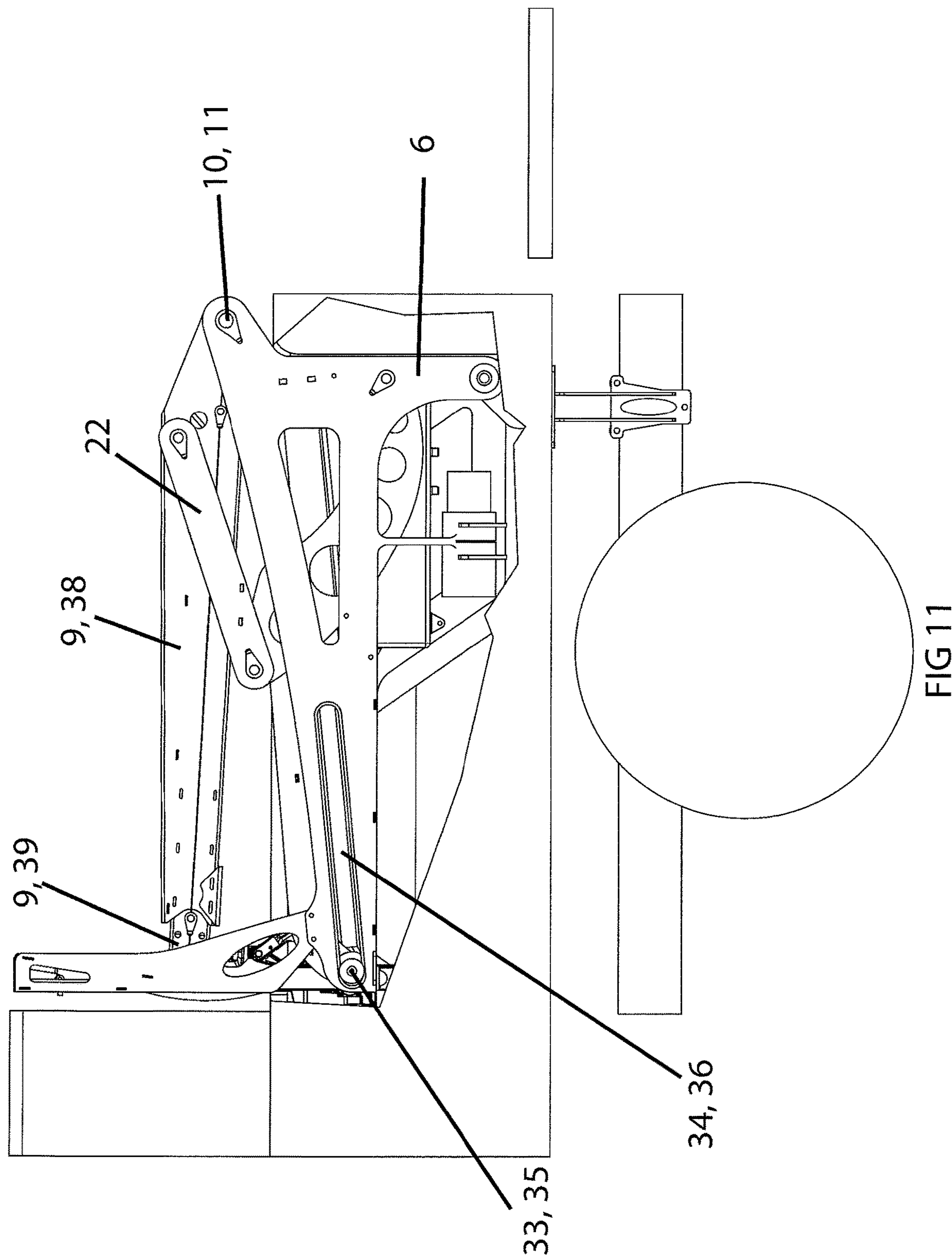

Referring to FIG. 10, it is shown how the lifting arm 10 is turned down toward the loading platform 2. The first part 38 of the lifting arm 9 and second part 39 have been brought together as much as possible, or to a required extent, so that the lifting arm 9 can be turned down towards the loading surface 2 on the vehicle 3. At this stage, the safety device 48 has started to be activated, which prevents the operation of the first part 38 of the lifting arm and second part 39 mutually.

Figure 12:
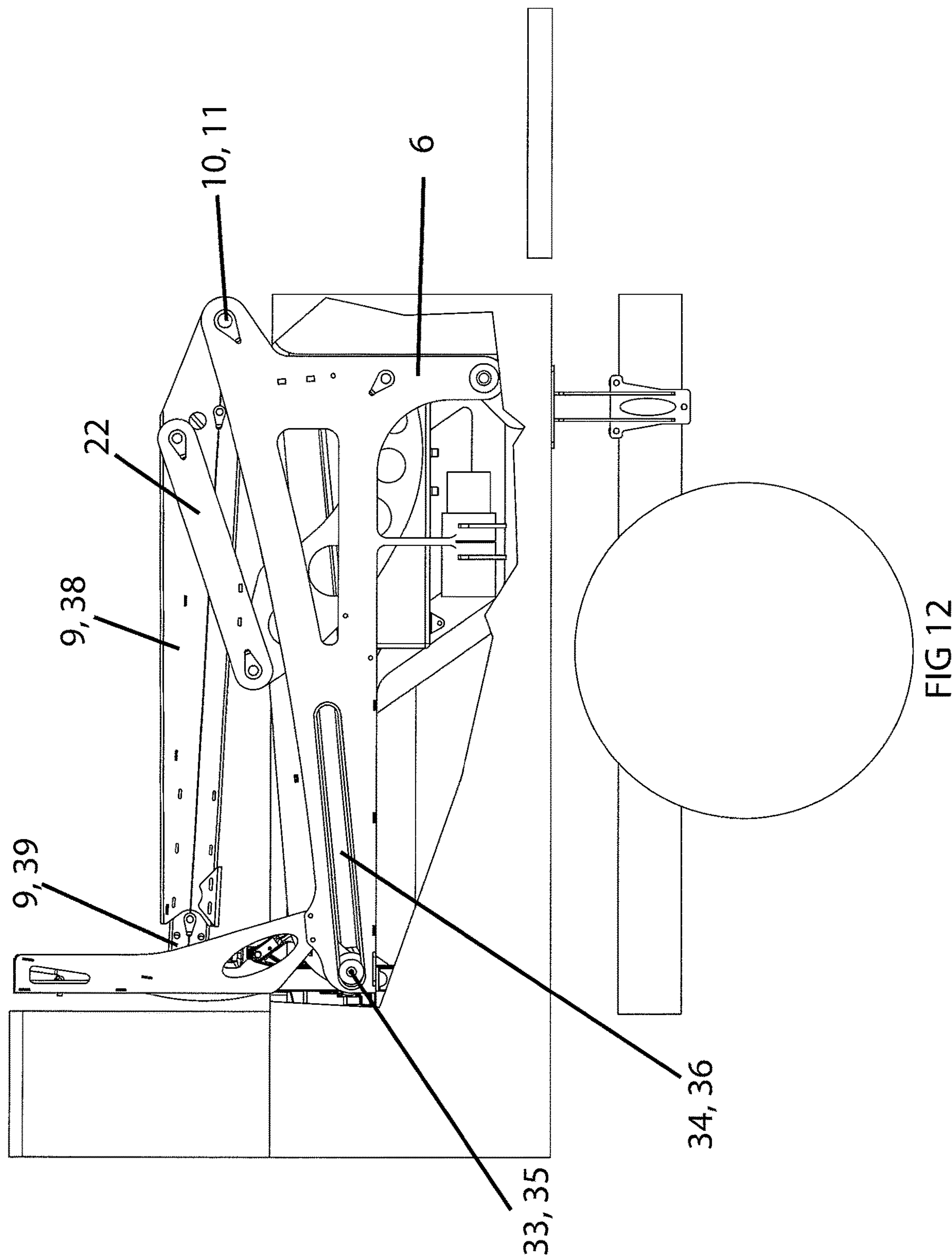
FIGS. 12 and 13 show alternative use of the lifting device.
Figure 13:
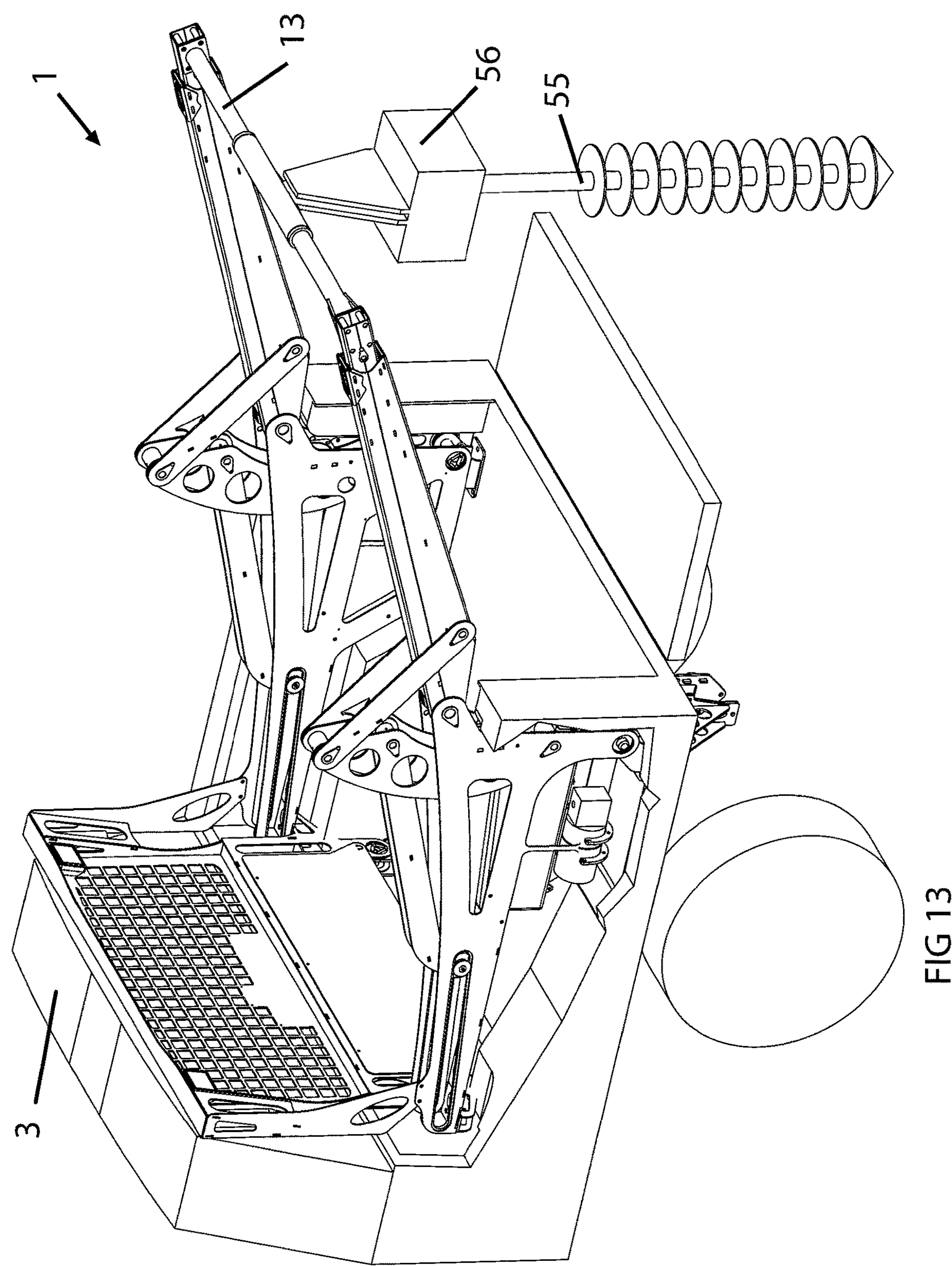

Referring to FIGS. 12 and 13, it is shown how the present invention can be used for purposes other than solely a lifting device. In this embodiment, the invention can be seen as a system which comprises various system components. Referring to FIG. 12, it is shown how a variant of container 54, flake or the like is connected to the lifting arm. The container 54 may be of various types and shapes. In the exemplary variant of the container 54, it includes at least one bottom and at least one wall. The container 54 is open in one direction when it is standing on the ground normally upward. The construction may also include a variant of a lid or the like. The container comprises at least one attachment or attachment device with which the container is connected to the lifting arm. The connection to the lifting arm can take place with different types of techniques.

Referring to FIG. 13, it is shown how the said lifting device is part of a system. The system includes a function for pressing or drilling at least one object in the ground. In the exemplary figure, a variant of a drill 55 connected to a drive unit 56 is shown. The drive unit 56 is connected to the lifting boom. The drive unit 56 actuates the drill 55 to rotate, whereupon it is lowered into the ground. The lifting device 1 is used to lift the drill out of the hole. It is further conceivable that the design is used to push down or drive down objects in the ground. For example, the device can be used in soil surveys where test printing of the soil's bearing capacity is examined, on the ground or at different depths in the soil.

Figure 14:
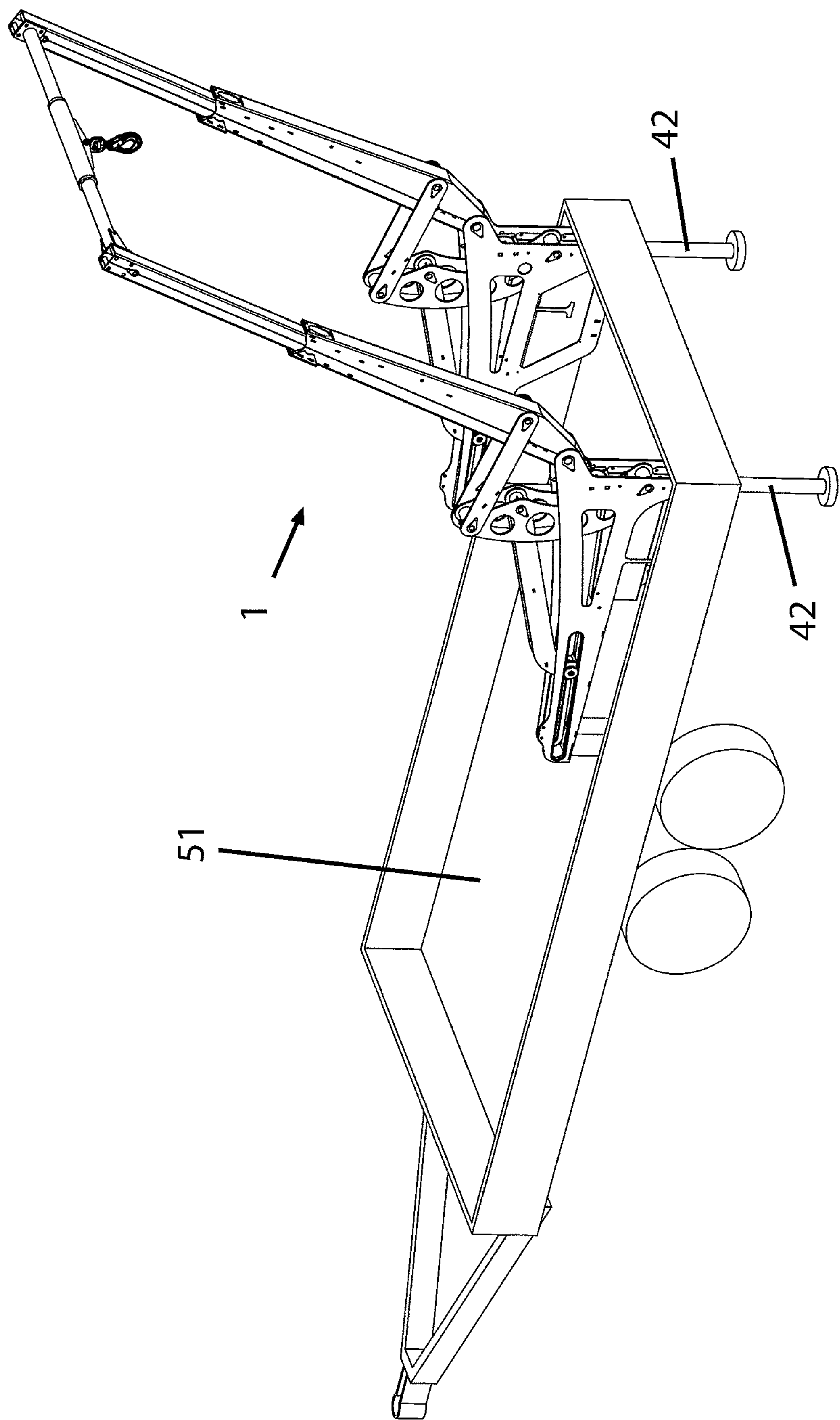
FIGS. 14-16 illustrate alternative applications for using the present lifting system.

Referring to FIG. 14, an exemplary alternative application for the present lifting system 1 is shown. In this application, the lifting system 1 is connected to a trailer 57, trailer or similar vehicle. The trailer must be of such a type that it can withstand the forces that a lift with the lifting device entails. In this case, the support legs 42 may be required for the lifting device to be reliably usable.

Figure 15:
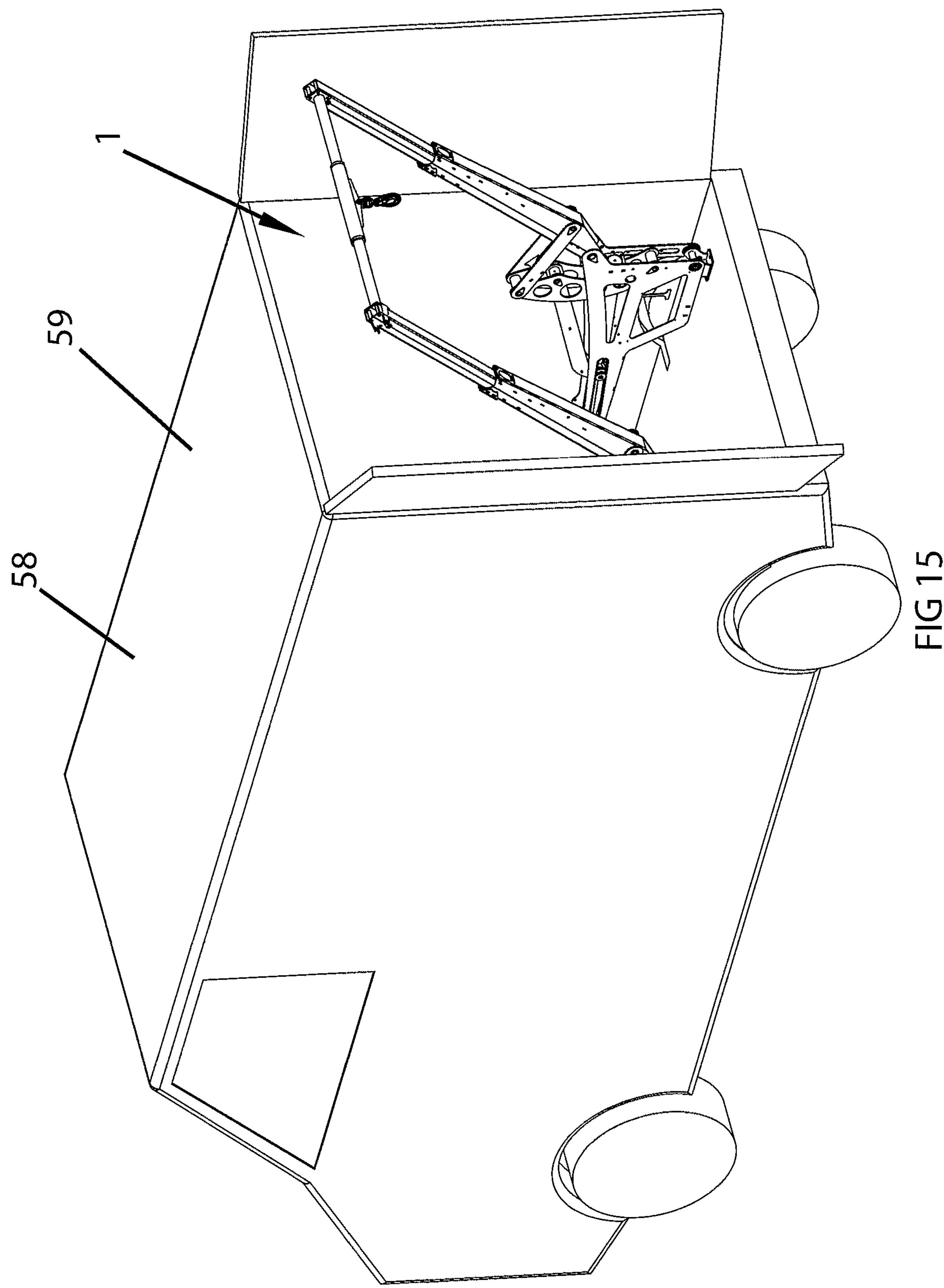

Referring to FIG. 15, a second alternative exemplary application for the present lifting system 1 is shown. In this application, lifting system 1 is connected to a vehicle with a covered cargo space 58 such as truck 59, van or the like. The vehicle must be of such a type that it can withstand the forces that a lift with the lifting device causes. In this case, the support legs may be required for the lifting device to be used reliably.

Figure 16:
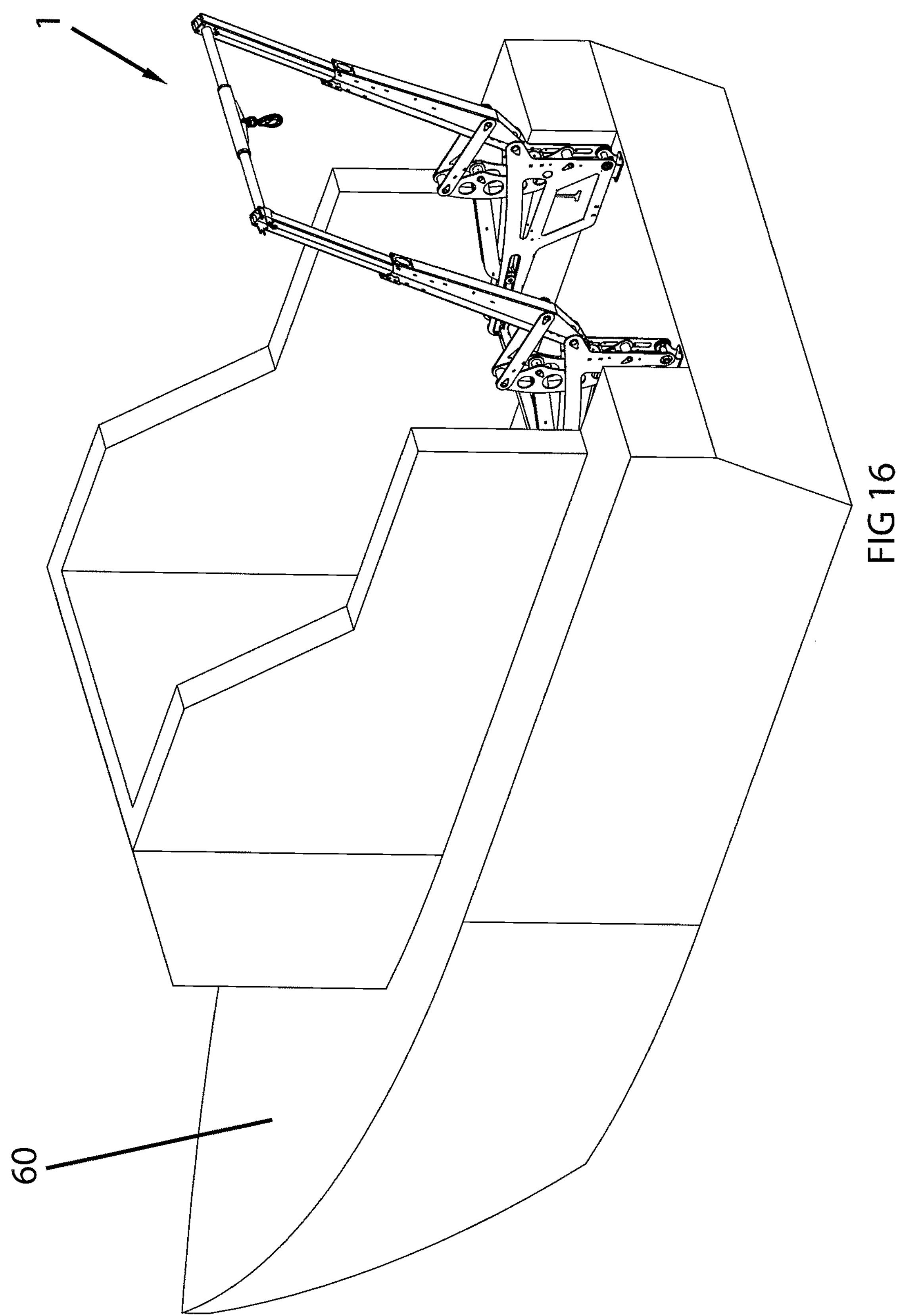

Referring to FIG. 16, a third alternative exemplary application for the present lifting system 1 is shown. In this application, lifting system 1 is connected to a boat 60, a ship or the like. The boat, alternatively the vessel, must be of such a type that it can withstand the forces which a lift with the lifting device 1 entails.

In further alternative embodiments, the lifting system may be used connected to an object other than a vehicle.

Although some preferred embodiments have been described in detail, variations and modifications within the scope of the invention may become apparent to those skilled in the art to which the invention pertains and all of them are considered to fall within the scope of the appended claims. Thus, it is conceivable that the present invention be used for other purposes and applications than those set forth in the present patent application.

In alternative embodiments of the lifting device, than exemplified in this patent application, the lifting device can be used in applications other than those specified in this patent application.

Advantages of the Invention

With the present invention, several advantages are achieved. Firstly, an improved lifting device is achieved which solves, or reduces, at least one of the technical problems mentioned in the background or in the description.

The invention claimed is:

1. A lifting system for mounting on a loading surface of a vehicle, comprising at least one first lifting arm system on one side of the loading surface in the transverse direction of the vehicle and at least one second lifting arm system on the other side of the loading surface in the transverse direction of the vehicle, which lifting arm system each comprises at least one foundation, comprising at least one first foundation part and at least one second foundation part, with which each respective lifting arm system is connected to the vehicle and that the lifting arm systems each comprise at least one lifting arm and at least one operating mechanism which is operated with at least one actuator, wherein the lifting arm comprises at least one first arm part and at least one second arm part which are telescopically displaceable relative to each other, and wherein the lifting system comprises a safety device comprising at least one first locking member and at least one second locking member which prevents mutual operation between the lifting arm first arm portion and second arm portion and that the lifting system comprises at least one lifting boom which extends between the lifting arm in the first lifting arm system and the lifting arm in the second lifting arm system wherein the operating mechanism comprises of at least one first operating arm, which at one end, or close proximity, is pivotally connected one to the second foundation part and that the first operating arm at its other end, or the end of the end, is connected to the lifting arm via at least one arm link, or the like, and that the operating arm and the arm link are each pivotally connected to each other to the respective lifting arm, and that the operating mechanism further comprises at least one operating link which is pivotally connected at one end to the operating arm and that at its other end is connected via a shaft to at least one free end of the at least one actuator and that the movement of the shaft during operation of the at least one actuator is controlled by at least one guide device.

2. The lifting system according to claim 1 wherein the at least one actuator consists of at least one hydraulic cylinder.

3. The lifting system according to claim 2, wherein the free end of the at least one hydraulic cylinder assembly is controlled by the at least one guide device.

4. The lifting system according to claim 3, wherein the at least one guide device comprises of at least one first guide member comprising at least a shaft and at least one second guide member comprises of at least one first guide groove and at least one second guide groove.

5. The lifting system according to claim 4, wherein the first guide groove and other guide grooves of the at least one guide device are angled 5.5 degrees plus minus 10 degrees relative to the horizontal direction or the plane of the loading surface.

6. The lifting system according to claim 1, wherein the at least one first locking member of the safety device comprises at least one pin and the at least one second locking member comprises a first hole and a second hole.

* * * * *